United States Patent
Wu et al.

(10) Patent No.: US 11,153,147 B2
(45) Date of Patent: Oct. 19, 2021

(54) DYNAMIC EVENT NOTIFICATION ROUTING AND DELIVERY DEVICE AND CORRESPONDING SYSTEMS AND METHODS

(71) Applicant: Motorola Mobility LLC, Chicago, IL (US)

(72) Inventors: Yi Wu, Chicago, IL (US); Thomas Merrell, St. Charles, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/384,777

(22) Filed: Apr. 15, 2019

(65) Prior Publication Data
US 2020/0328933 A1 Oct. 15, 2020

(51) Int. Cl.
*H04L 12/24* (2006.01)
*H04L 12/725* (2013.01)
*H04L 29/08* (2006.01)

(52) U.S. Cl.
CPC ............ *H04L 41/06* (2013.01); *H04L 45/308* (2013.01); *H04L 67/2823* (2013.01); *H04L 67/30* (2013.01); *H04L 67/36* (2013.01)

(58) Field of Classification Search
CPC ..... H04L 41/06; H04L 67/2823; H04L 67/30; H04L 67/36; H04L 45/308
USPC ....................................................... 709/206
See application file for complete search history.

(56) References Cited

U.S. PATENT DOCUMENTS

| | | | |
|---|---|---|---|
| 10,657,242 B1* | 5/2020 | Xia | G06F 21/35 |
| 10,755,537 B1* | 8/2020 | Palmer | H04N 7/185 |
| 2008/0092199 A1* | 4/2008 | McCarthy | H04N 21/26291 725/133 |
| 2014/0188729 A1* | 7/2014 | Hong | H04L 12/1895 705/44 |
| 2014/0189015 A1* | 7/2014 | Chan | G06Q 10/107 709/204 |
| 2014/0244710 A1* | 8/2014 | Sharma | H04W 4/21 709/201 |

(Continued)

OTHER PUBLICATIONS

"Learn about camera alerts and how to change settings", Nest Support; https://nest.com/support/article/learn-more-about-the-alerts-you-ll-get-from-your-camera; unknown Publication date but believed to be prior to filing of present application.

(Continued)

*Primary Examiner* — Tauqir Hussain
(74) *Attorney, Agent, or Firm* — Philip H. Burrus, IV

(57) ABSTRACT

An electronic device includes a communication device communicating with one or more Internet-of-things devices, one or more processors, and a memory. The communication device receives, from at least one Internet-of-things device, an event notification. The one or more processors identify a notification recipient to whom the event notification should be sent from a plurality of predefined system users, select a receiving electronic device from at least two electronic devices belonging to the notification recipient, convert the event notification from a first event notification type to a second event notification type that is receivable by the receiving electronic device, and transmit the event notification to the receiving electronic device.

20 Claims, 8 Drawing Sheets

(56) References Cited

U.S. PATENT DOCUMENTS

| | | | | |
|---|---|---|---|---|
| 2017/0004508 | A1* | 1/2017 | Mansfield | G06Q 30/012 |
| 2017/0034470 | A1* | 2/2017 | Kleinrock | H04N 5/23238 |
| 2017/0041381 | A1* | 2/2017 | Tal | H04W 12/04 |
| 2017/0169640 | A1* | 6/2017 | Britt | H04W 12/041 |
| 2018/0153023 | A1* | 5/2018 | Meerbeek | H05B 47/16 |
| 2018/0349242 | A1* | 12/2018 | Mathews | H04W 12/50 |
| 2018/0376290 | A1* | 12/2018 | Dhillon | H04W 4/023 |
| 2019/0012902 | A1* | 1/2019 | Kumar | H04L 67/26 |
| 2019/0036720 | A1* | 1/2019 | Knudson | H04L 12/1895 |
| 2019/0064792 | A1* | 2/2019 | Cella | H04B 17/345 |
| 2019/0073894 | A1* | 3/2019 | Mehta | G08B 26/007 |
| 2019/0356621 | A1* | 11/2019 | Bulut | G06Q 10/107 |

OTHER PUBLICATIONS

Ahvar, et al., "Sensor Network-Based and User-Friendly User Location Discovery for Future Smart Homes", Published online Jun. 27, 2016; https://www.ncbi.nlm.nih.gov/pmc/articles/PMC4970021/.

Duino, Justin , "You can now set a default music/TV playback device when Casting from Google Home, here's how", Published online Oct. 5, 2017; https://9to5google.com/2017/10/05/how-to-set-a-preferred-media-playback-device-google-home-music-tv-android-basics/.

Friedlein, Ashley , "Smart notificatios: the next evolution of messaging", Published online Oct. 11, 2016; https://blog.ably.io/smart-notifications-the-next-evolution-of-messaging-6dcb24bf857.

Klauck, et al., "Noticeable or Distractive? A Design Space for Gaze-Contingent User Interface Notifications", CHI'17 Extended Abstracts; May 11, 2017; http://dx.doi.org/10.1145/3027063.3053085.

Naumenko, Yaroslav , "5 Keys to Designing User Experience for IoT Products", Published on Sep. 10, 2018 online; https://blog.prototypr.io/5-keys-to-designing-user-experience-for-iot-products-c25efcb97c2d.

Townsend, Tess , "Nest's new camera uses the same facial recognition tech as Google Photos", Published May 31, 2017 online https://www.recode.net/2017/5/31/15708124/nest-iq-camera-indoor-facial-recognition-technology-google-photos.

Williams, Rhiannon , "Future iPhones could contain eye-tracking software", Published on Nov. 17, 2015 online; https://www.telegraph.co.uk/technology/apple/12001524/Future-iPhones-could-contain-gaze-tracking-software.html.

Zhang, et al., "Everyday Eye Contact Detection Using Unsupervised Gaze Target Discovery", Published online Oct. 27, 2017; https://doi.org/10.1145/3126594.3126614.

Young, Lee , "PCT Search Report and Opinion", PCT/US2020/027966; Filed Apr. 13, 2020; dated Jul. 1, 2020.

* cited by examiner

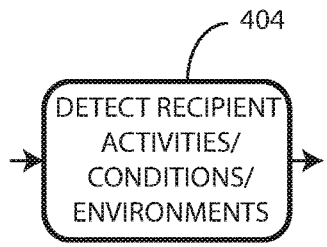
*FIG. 7*
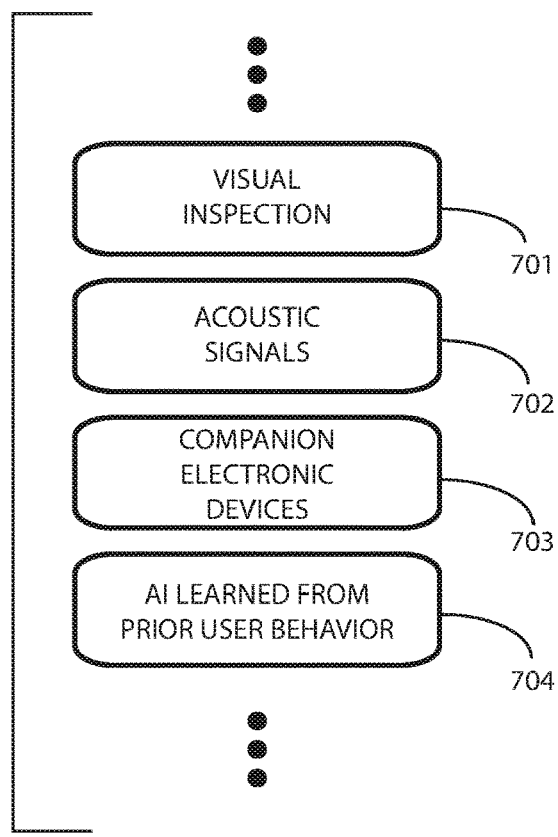
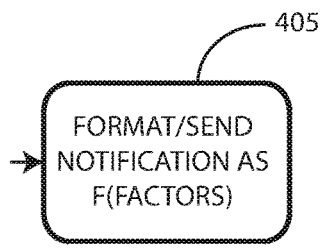
*FIG. 8*
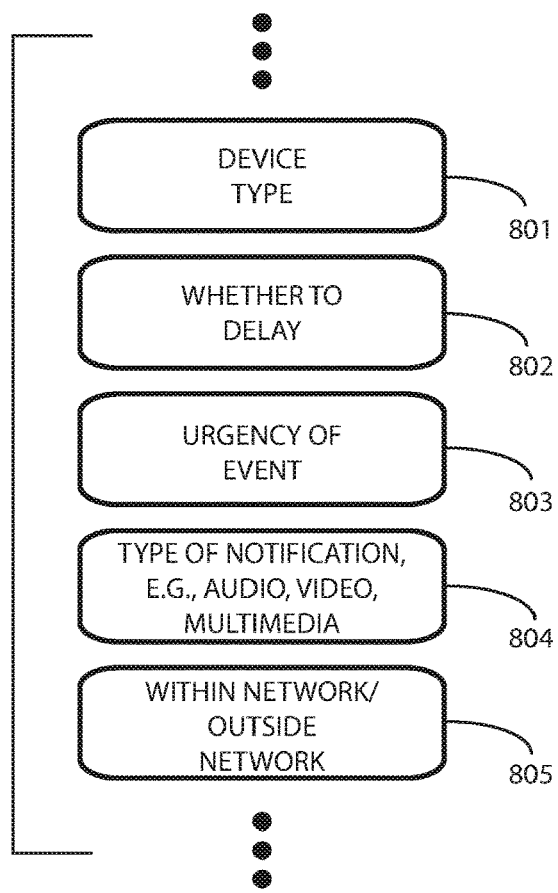

DYNAMIC EVENT NOTIFICATION ROUTING AND DELIVERY DEVICE AND CORRESPONDING SYSTEMS AND METHODS

BACKGROUND

Technical Field

This disclosure relates generally to electronic devices, and more particularly to electronic devices having data communication capabilities.

Background Art

As the amount of processing power that can economically be incorporated into electronic devices has increased, so too has the use of electronic devices to perform commonplace tasks. For example, not too long ago the only way to turn on the lights in a home was with by toggling a light switch on the wall. Today, with the advent of "Internet-of-things" devices, a smartphone can wirelessly communicate with an Internet-of-things light switch, thereby allowing a person to turn on the lights remotely by delivering a command to a user interface of the smartphone.

As the number of Internet-of-things devices in use in a given network increases, problems can arise. It can be challenging, for instance, to configure the network to properly route and exchange communication messages between the varied types of electronic devices. It would be advantageous to have an improved device offering more seamless electronic communication routing and delivery.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 7 illustrates one or more method steps in accordance with one or more embodiments of the disclosure.

FIG. 8 illustrates one or more method steps in accordance with one or more embodiments of the disclosure.

Figure 1:
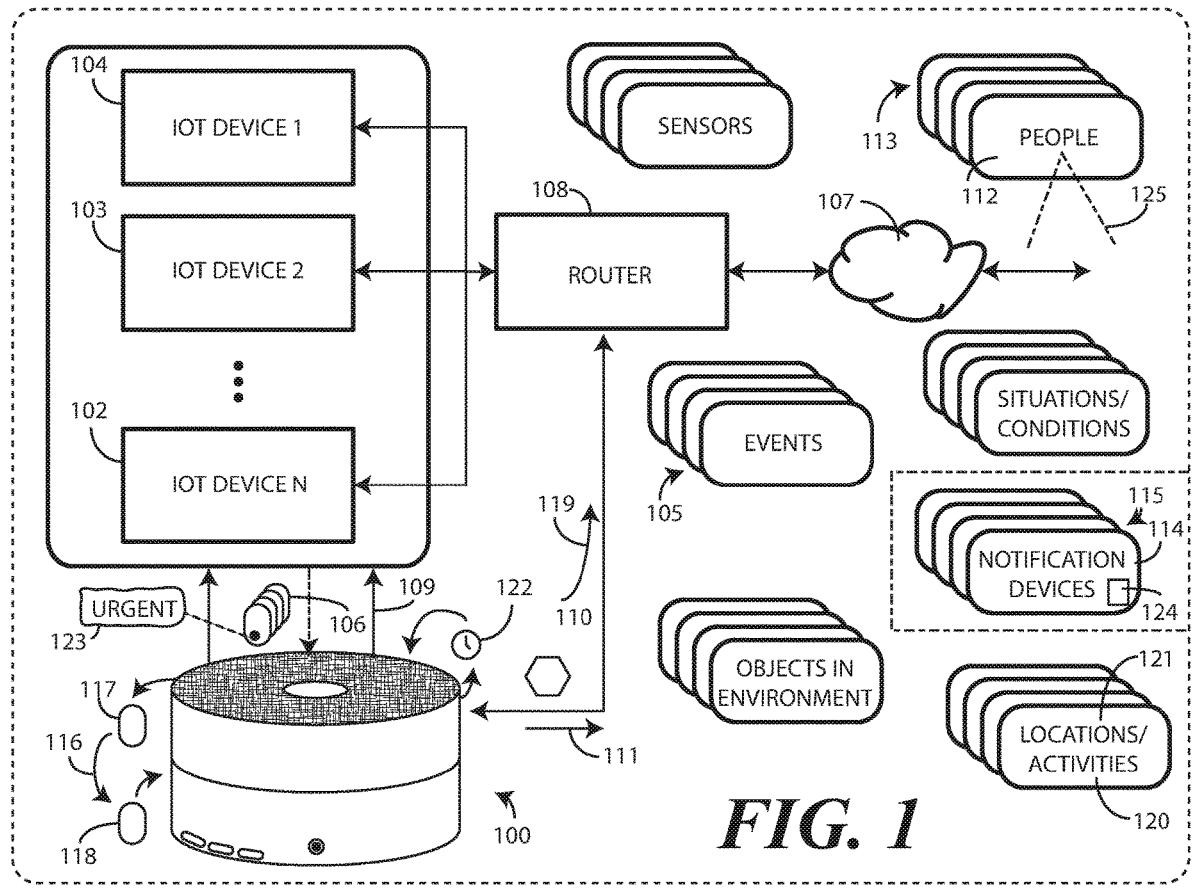
FIG. 1 illustrates on explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using an electronic device operating in a network of Internet-of-things devices that dynamically routes and delivers event notifications received from one or more of the Internet-of-things devices. For example, the electronic device can, upon receiving an event notification from an Internet-of-things device, determine to which person the event notification should be sent, to which electronic device near the person the event notification should be delivered, and when the event notification should be delivered as a function of activities in which the person is engaged and an urgency level corresponding to the event notification.

Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of employing an electronic device to dynamically route and deliver event notifications received from one or more Internet-of-things devices by identifying a notification recipient, selecting an electronic device from two or more electronic devices belonging to the notification recipient, converting the event notification from a first event notification type to a second event notification type that is receivable by the selected electronic device, and transmitting the event notification to the receiving electronic device. The non-processor circuits may include, but are not limited to, a radio receiver, a radio transmitter, signal drivers, clock circuits, power source circuits, and user input devices. As such, these functions may be interpreted as steps of a method to perform, for example, the dynamic routing, formatting, delivery time selection, and delivery of event notifications to electronic devices belonging to notification recipients selected by the methods, devices, and systems described below.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within 10 percent, in another embodiment within 5 percent, in another embodiment within 1 percent and in another embodiment within 0.5 percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

In prior art Internet-of-things networks, when an Internet-of-things device detects an event, one of two things occurs: First, the detecting Internet-of-things device may make a sound or emit another signal that is only detectable within a limited environment situated directly around the Internet-of-things device. Second, if a user has pre-programmed the Internet-of-things device to take specific actions upon detecting the event, the processors of the detecting Internet-of-things device follow this programming and forward a notification to the pre-programmed, predefined, designated receiving device.

Each of these actions has problems. The first action limits the range within which the emitted sound or signal can be detected. If, for example, a dryer emits a beeping sound when clothes are dry, but a person is in another part of the home, the person may not even be able to hear the beep. The second action requires advanced programming skills, with a person having to manually program each Internet-of-things device in the network, instructing the same how to forward each event notification. Moreover, this second action results in every event notification being forwarded in exactly the same manner, to the exact same device, in accordance with the pre-programmed routine.

Embodiments of the disclosure contemplate that there is value in instead dynamically routing and delivering event notifications received from Internet-of-things devices so that they are delivered to the right electronic device, belonging to the right person, at the right time, and in the right format. Embodiments of the disclosure thus provide methods, electronic devices, and corresponding systems that dynamically route and deliver event notifications received from Internet-of-things devices by identifying a notification recipient, selecting a receiving electronic device from two or more electronic devices belonging to the notification recipient, converting the event notification into a format that is receivable by the receiving electronic device, and transmitting the event notification to the receiving electronic device. Additionally, embodiments of the disclosure can determine whether to delay the transmission of the event notification as a function of factors such as event notification recipient activities, event notification urgency, event notification recipient preferences, and event notification recipient location, among other factors.

Advantageously, embodiments of the disclosure eliminate the physical transmission range associated with prior art Internet-of-things devices by dynamically converting and routing event notifications received from Internet-of-things devices. Embodiments of the disclosure therefore facilitate the routing and delivery of event notifications to different people and different receiving electronic devices, but with the appropriate output format and at the appropriate event notification delivery time. It should be noted that while embodiments of the disclosure are described below as working with one or more Internet-of-things devices in an Internet-of-things network for illustration, embodiments of the disclosure could equally be configured to perform similar dynamic routing and delivery of event notifications in other networks, including wide area networks, local area networks, ad hoc peer-to-peer networks, and other networks as well.

When operating in an Internet-of-things network, a dynamic routing and delivery electronic device configured in accordance with embodiments of the disclosure can be configured as a central console unit such as an Internet-of-things hub device or router device. In other embodiments, the dynamic routing and delivery electronic device can be configured as one of the Internet-of-things devices themselves. In still other embodiments, the dynamic routing and delivery electronic device could be configured as a stand-alone device that is in peer-to-peer communication with one or more Internet-of-things devices. Other network topologies and configurations for the dynamic routing and delivery electronic device will be obvious to those of ordinary skill in the art having the benefit of this disclosure.

Using a central console unit as an example, in one or more embodiments the central console unit receives and collects electronic signals from various Internet-of-things devices working within a given Internet-of-things network. In one or more embodiments, the central console unit is then responsible for dynamically routing and delivering electronic signals to receiving electronic devices selected by the central console unit.

In one or more embodiments, the central console unit performs four fundamental steps when performing the dynamic routing and delivery of such signals. First, the central console unit receives, from at least one Internet-of-things device, an event notification. Event notifications can take any of a variety of forms, depending upon the type of Internet-of-things device sending the event notification. For example, an Internet-of-things microwave may deliver an event notification signal that the popcorn is done, while an Internet-of-things dryer may send an event notification signal that the clothes are dry. An Internet-of-things security system may send an event notification signal that an intruder is in the house, while an Internet-of-things smoke detector may send an event notification signal that the house is on fire. Other examples of event notifications will be described below. Still others will be obvious to those of ordinary skill in the art having the benefit of this disclosure.

Second, the central console unit determines to which user or users the event notification should be sent. In one or more embodiments, the central console unit identifies a notification recipient to whom the event notification should be sent from a plurality of predefined system users. Using a home as an example, in one or more embodiments the central console unit may select which family member should be notified of a particular event from the plurality of predefined system users defined by the family itself. In an office setting, the central console unit may identify a notification recipient or recipients from the plurality of predefined system users defined by employees and agents of the business, and so forth.

In one or more embodiments, the selection of the notification recipient occurs as a function of one or more factors. In one or more embodiments, a factor considered by one or more processors of the central console unit in selecting the notification recipient comprises notification recipient activity. If the husband of a family starts making dinner, but then goes to take a shower, when an Internet-of-things cookware device transmits an event notification indicating that dinner is ready, one or more processors of the central console unit may identify the wife of the family as the notification recipient due to the fact that the wife is in a room adjacent to the kitchen, combined with the fact that the husband's current activity temporarily precludes him from responding to the event notification. This is but one example of a notification recipient activity. Others will be described below. Still others will be obvious to those of ordinary skill in the art having the benefit of this disclosure.

In one or more embodiments, the one or more processors also select the notification recipient based upon event notification urgency. Embodiments of the disclosure contemplate that some event notifications will be more urgent than others. An event notification signal indicating that clothes are dry will have a lower urgency, for example, than an event notification signal indicating that the house is on fire. Accordingly, if a husband and wife live in a home, and the wife is traveling, and the husband is taking a nap, while the one or more processors of the central console unit may ordinarily not send an event notification to the husband due to the fact that he is sleeping, the one or more processors may select him as a function of event notification urgency if he is sleeping in a house that is on fire.

Third, embodiments of the disclosure determine an output device belonging or near to the notification recipient to which the event notification should be sent. In one or more embodiments, the one or more processors select a receiving electronic device from at least two electronic devices belonging to, or near to, the notification recipient to whom the event notification should be sent.

In one or more embodiments, this receiving electronic device selection occurs as a function of one or more factors. Illustrating by example, these factors can include location of the notification recipient or the notification recipient's activity. In one or more embodiments, the one or more processors of the central console unit determine, sometimes with the assistance of sensors situated in at least one Internet-of-things device, a location of the notification recipient to whom the event notification should be sent. Where such a location is determined, in one or more embodiments the selection of the receiving electronic device can occur as a function of the location of the notification recipient.

In one or more embodiments, the one or more processors of the central console unit identify, again sometimes using one or more sensors of an least one Internet-of-things device, an activity being performed by the notification recipient to whom the event notification should be sent. Where such an activity is identified, in one or more embodiments the selection of the the receiving electronic device can occur as a function of the activity being performed by the notification recipient.

If, for instance, a person is in a living room watching an Internet-of-things television with a smartphone situated on a nearby table, the one or more processors of the central console unit may select the Internet-of-things television as the receiving electronic device due to the fact that the notification recipient is already looking at this device, and is not looking at the smartphone. Similarly, the notification recipient has a mobile device, such as a smartphone or tablet computer within reach, but the current activity of the notification recipient prevents them from accessing this device, e.g., when showing, in one or more embodiments the one or more processors of the central console unit may select an Internet-of-things speaker or music player to deliver an event notification audibly. Alternatively, the one or more processors of the central console unit may still select the mobile device, but may configure the format of the event notification differently, e.g., by using a voice assistant of the mobile device to ask the notification recipient whether they would like to have the event notification read aloud and/or whether the notification recipient would like to deliver a reply by voice command.

In other embodiments, if the notification recipient has a preferred notification device, e.g., a personal smartphone, but that device is in another location, e.g., another room, the one or more processors of the central console unit may select a different device that is proximately located with the notification recipient as the receiving electronic device. The one or more processors of the central console unit may deliver the event notification signal to a computer monitor upon which the notification recipient is gazing. Alternatively, the one or more processors of the central console unit may deliver the event notification signal to an Internet-of-things speaker or voice assistant.

In situations where multiple displays were within the immediate environment of the notification recipient, such as would be the case if the notification recipient were watching a game on television while surfing the web on a tablet computer, the one or more processors of the central console unit may select the display at which the notification recipient was actually looking. Advantageously, embodiments of the disclosure do not rely upon static, predefined, pre-programmed event notification rules. To the contrary, in one or more embodiments the central console unit can dynamically adjust the output device and format based upon a function of various factors such as the event type, the event urgency, the activity being performed by the notification recipient, and which devices are near the notification recipient. Other factors suitable for use in dynamically routing and delivering event notification signals will be obvious to those of ordinary skill in the art having the benefit of this disclosure.

Fourth, embodiments of the disclosure determine the format and timing for delivery of the event notification, and thereafter deliver the event notification. In one or more embodiments, one or more processors of an electronic device, after selecting a receiving electronic device from at least two electronic devices belonging to, or near to, the notification recipient, convert the event notification from a first type to a second type that is receivable by the electronic device. In one or more embodiments, the one or more processors thereafter transmit the event notification to the receiving electronic device.

Illustrating by example, if an Internet-of-things oven transmits a event notification signal in computer code that indicates a head of cauliflower is completely baked, and a person is in a room without a visible display, but which includes one or more Internet-of-things loudspeakers or voice assistants, one or more processors of the central console unit may convert the computer code to signals used to generate analog audio saying, "Buster, your cauliflower is ready."

In one or more embodiments, the one or more processors of the central console unit can insert delays prior to transmitting. In one or more embodiments, these delays result in the event notification being transmitted at a later time. In one or more embodiments, the decision whether to delay transmission of the event notification to the receiving electronic device can occur as a function of one or more factors. These factors can include activities being performed by the event notification recipient, the urgency of the event notification, or other factors.

In one or more embodiments, the one or more processors delaying the transmitting of the event notification as a function of the activity being performed by the notification recipient. In one or more embodiments, the one or more processors further determine an urgency associated with the event notification. Where the urgency indicates that the event notification is an urgent notification, in one or more embodiments the one or more processors override any delay of the transmission. If, for example, the notification recipient is sleeping and the event notification is other than an urgent notification, the one or more processors of the central console unit may delay transmitting the event notification until the morning. However, if the notification recipient is sleeping and the event notification is an urgent event notification, the one or more processors may override the delay and transmit the event notification immediately, thereby waking the notification recipient.

Performing these four fundamental operations, embodiments of the disclosure can dynamically route and deliver event notifications in unique ways so as to automatically further satisfy preferences of the notification recipient. For instance, in one or more embodiments the one or more processors dynamically route and deliver event notifications as a function of whether the activity being performed by the notification recipient is interruptible. In one or more embodiments the one or more processors dynamically route and deliver event notifications as a function of the relationship between the activity being performed by the notification recipient and the event notification. Of course, a combination of these factors can be used.

Illustrating by example, a notification recipient would want to know when an Internet-of-things microwave finishes thawing vegetables while preparing dinner. Accordingly, the one or more processors of the central console unit, upon receiving such an event notification from the Internet-of-things microwave, would immediately transmit the event notification to an appropriately selected receiving electronic device from two or more available to the notification recipient. However, due to the unrelatedness of the activity and event, as well as the relative uninterruptibility of the dinner preparation sequence, the notification recipient would not want to know that an Internet-of-things furnace needs its filter changed while the notification recipient is preparing dinner. Accordingly, in such a use case the one or more processors may delay transmitting the event notification until a later time.

In one or more embodiments, in addition to being responsive to event notifications transmitted by Internet-of-things devices, embodiments of the disclosure can be responsive to user commands as well. As noted above, advantages of embodiments of the disclosure include the fact that transmission of information in accordance with pre-programmed, predefined rules to predefined devices is eliminated. Advantageously, in one or more embodiments the dynamic routing and delivery can occur in response to user commands as well. Illustrating by example, in one or more embodiments the voice command, "play the video clip for my wife" can result in the dynamic routing and delivery of the video content to another display located within eyeshot of the wife, and so forth.

Embodiments of the disclosure contemplate that the four primary functions described above can be performed in a single device in one or more embodiments. In other embodiments, the functions can be performed by multiple electronic devices in a distributed architecture. However, in a primary embodiment a central console unit, configured as a single, integrated device, performs the four functions. One advantage of this is that the Internet-of-things devices (or other devices in other constructs) need not have any machine knowledge of the system or other devices communicating with the network. Those Internet-of-things devices simply detect events and deliver event notifications to the central console unit.

Similarly, the selected receiving electronic devices do not have to know why they were chosen to receive the event notification, or why they may be required to receive a response from the notification recipient. Instead, only the central console unit shoulders the burden of identifying the notification recipient, selecting the receiving electronic device, converting the event notification to a type receivable by the receiving electronic device, and transmission of the event notification to the receiving electronic device. This allows each Internet-of-things device other than the central console unit to be simpler and less expensive. Additionally, this allows the Internet-of-things devices simply "plug and play" with the central console unit without any special programming Other advantages of embodiments of the disclosure will be described below. Still others will be obvious to those of ordinary skill in the art having the benefit of this disclosure.

Embodiments of the disclosure provide an electronic device that is operable with one or more other electronic devices having one or more sensors. The one or more sensors of the other electronic devices can be used not only to detect events, but to assist the dynamic routing and delivery electronic device in performing activities such as identifying the notification recipient to whom the event notification should be sent, selecting the receiving electronic device, determining notification recipient activities, and other operations. For instance, the dynamic routing and delivery electronic device may employ an imager or depth imager of an Internet-of-things device to determine which electronic device a notification recipient is using, gazing at, or engaging with to select that device as the receiving electronic device.

When employed in an Internet-of-things network, the dynamic routing and delivery electronic device can be configured as a central console unit that includes a communication device. In one or more embodiments, the communication device can communicate with one or more Internet-of-things devices via wired and/or wireless communication techniques. In one or more embodiments, the communication device of the central console unit communicates with one or more Internet-of-things devices that are operating on a network. Optionally, the network can be operational within a predefined area, such as a home, within which the central console unit is situated.

In one or more embodiments, the central console unit optionally includes a memory and an Artificial Intelligence (AI) engine. In one or more embodiments, the AI engine receives inputs and/or control settings from the one or more Internet-of-things devices and transforms the inputs and control settings into machine-learned knowledge stored in an Internet-of-things knowledge domain of the memory. In so doing, the central console unit can learn preferred activities or actions of a plurality of predefined system users, thereby assisting the one or more processors of the central console unit in selecting which of these users should be the notification recipient or recipients.

In one or more embodiments, the central console unit functions as a "central go-to person" that dynamically receives, routes, and dispatches event notifications to notification recipients and receiving electronic devices that are selected by the one or more processors of the central console unit, and which are delivered at a time selected by the one or more processors of the central console unit. The one or more processors can further convert received event notifications into formats suitable for delivery to the receiving electronic device to ensure that the event notifications are properly displayed or otherwise presented to the notification recipient when received.

Turning now to FIG. 1, illustrated therein is one explanatory system in accordance with one or more embodiments of the disclosure. In the illustrative embodiment of FIG. 1, the system includes an electronic device, configured here as a central console unit 100, which is in communication with one or more other electronic devices on a network 101. In one or more embodiments, the central console unit 100 is configured to facilitate the routing and delivery of event notifications to different people and different receiving electronic devices, but with the appropriate output format and at the appropriate event notification delivery time.

In one or more embodiments, the central console unit 100 and other electronic devices communicate on a local area network, such as a local home Wi-Fi network. However, embodiments of the disclosure are not limited to this, as communication can occur between the central console unit 100 and the other electronic devices across several networks: Home Wi-Fi; Internet Service Provider WAN; cellular WAN; and so forth. Thus, it could be possible for the central console unit 100 to be in the same location as the other electronic devices, but using another network.

For ease of illustration, the network 101 of FIG. 1 will be described as an Internet-of-things network, with each of the electronic devices in communication with central console unit 100 comprising Internet-of-things devices 102,103,104. However, it should again be noted that embodiments of the disclosure could equally be configured to perform similar dynamic routing and delivery of event notifications in other networks, including wide area networks, local area networks, ad hoc peer-to-peer networks, and other networks as well.

In one embodiment, the central console unit 100 is configured as an Internet of Things hub. In another embodiment, the central console unit 100 is configured as an Internet-of-things device. In one or more embodiments, the central console unit 100 includes a communication circuit configured for wired or wireless communication with various Internet-of-things devices 102,103,104, as well as one or more processors that are operable with the communication device.

In one or more embodiments, the central console unit 100 can receive, from at least one Internet-of-things device, one or more event notifications 106 in response to the Internet-of-things devices 102,103,104 detecting one or more events 105. While an Internet-of-things hub is one example of a central console unit 100 configured in accordance with one or more embodiments of the disclosure, the methods and systems described herein are suitable for use for any number of other electronic devices, as will be obvious to those of ordinary skill in the art having the benefit of this disclosure.

As used herein, an Internet-of-things device is an electronic device having a unique identity, and which is configured for wireless and/or wired communication across a network such as a local area network or a wide area network such as the Internet. Some examples of Internet-of-things devices include controllable lights and light fixtures, smart television sets, smoke alarms, electronic thermostats, security systems, camera systems, entertainment systems, plumbing systems, HVAC systems, appliances, culinary devices, and so forth. Numerous other Internet-of-things devices will be obvious to those of ordinary skill in the art having the benefit of this disclosure. Also, as the numbers and types of Internet-of-things devices continue to expand, embodiments of the disclosure contemplate new features and enhancements being developed with which Internet-of-things devices can interact with other electronic device, or adapt their behavior, depending on signals received from the Internet-of-things hub.

Each Internet-of-things device 102,103,104 can include its own circuitry, including processor(s), memory device(s), sensor devices, optional user interfaces, control circuits, and/or optional output device(s). In one or more embodiments, the sensor devices detect events corresponding to the function that the Internet-of-things device is designed to perform. Illustrating by example, an Internet-of-things security system may include cameras to detect persons, motion sensors to detect movement, acoustic sensors to detect glass breaks and other sounds, and so forth. An Internet-of-things smoke detector may include thermal sensors to detect excessive heat, as well as smoke and/or carbon monoxide sensors to detect the presence of fire. An Internet-of-things washer or dryer may include sensors to determine when laundry has finished its washing cycle or when clothes in the dryer are dry. These are illustrative examples only, as other sensors and other event detectors will be obvious to those of ordinary skill in the art having the benefit of this disclosure.

Figure 2:
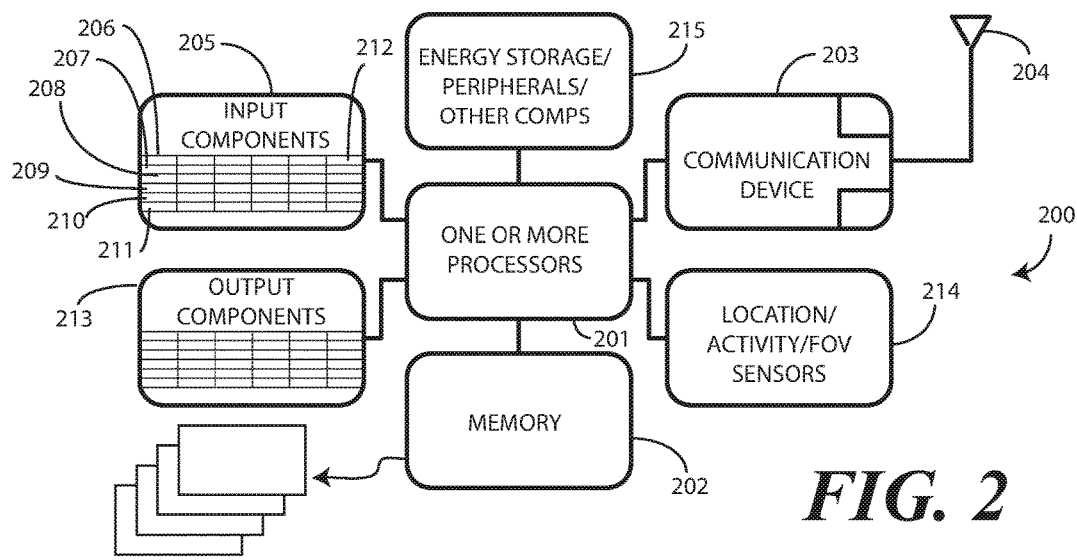
FIG. 2 illustrates one explanatory Internet-of-things device in accordance with one or more embodiments of the disclosure.

Turning briefly to FIG. 2, illustrated therein is one explanatory schematic block diagram 200 of one illustrative Internet-of-things device (102). In one embodiment, the Internet-of-things device (102) includes one or more processors 201 or control circuits. The one or more processors 201 are operable with the various components of the Internet-of-things device (102). The one or more processors 201 can be configured to process and execute executable software code to perform the various functions of the Internet-of-things device (102).

A storage device, such as memory 202, can optionally store the executable software code used by the one or more processors 201 during operation. The software code can embody program instructions and methods to operate the various functions of the Internet-of-things device (102), and also to execute software or firmware applications and modules. The one or more processors 201 can execute this software or firmware, and/or interact with modules, to provide device functionality.

The Internet-of-things device (102) can be dedicated to a particular function. Examples of these functions include providing controls and/or sensors for actuating lighting, providing controls and/or sensors for actuating heating, ventilation, and air conditioning systems, providing controls and/or sensors for performing security operations, providing controls and/or sensors for providing output of audio content, video content, or multimedia content, providing controls and/or sensors for plumbing systems, providing controls and/or sensors for culinary appliances, providing controls and/or sensors for household appliances, and so forth. These specific functions are illustrative only, as numerous others will be obvious to those of ordinary skill in the art having the benefit of this disclosure.

Where configured to perform such a function, in one or more embodiments the one or more processors 201 are capable of using various input components 205, described below, to detect one or more events (105). For example, an Internet-of-things plumbing system may be able to use the input components 205 to detect water running, water leaking, burst pipes, a ruptured water heater, a lack of water receipt from the main, or other water related events.

Alternatively, the Internet-of-things device (102) can be configured as a more general device. For instance, the Internet-of-things device (102) may simply be an imager or camera configured to record activity in its general field of view. The Internet-of-things device (102) may be a simple audio output device configured to play music. Where so configured, in one or more embodiments the Internet-of-things device (102) can still be operable to detect events. For example, if the Internet-of-things device (102) is configured as an imager or camera, in one or more embodiments the one or more processors 201 can perform image analysis on the captured images to determine whether motion is occurring and so forth.

The one or more processors 201 can be responsible for performing the primary functions of the Internet-of-things device (102) in one or more embodiments. Executable software code used by the one or more processors 201 can be stored in the memory 202. Such modules can comprise instructions, control algorithms, and so forth.

In this illustrative embodiment, the schematic block diagram 200 also includes a communication circuit 203 that can be configured for wired or wireless communication with one or more other devices or networks. Where configured to communicate wirelessly, the communication circuit 203 can include wireless communication circuitry, such as one of a receiver, a transmitter, or transceiver, and one or more antennas 204. In one or more embodiments, the communication circuit 203 is capable of communicating with one or more remote devices across a wide area network, local area network, small local area network (piconet), or personal area networks.

The one or more processors 201 can also be operable with other components. The other components can include the input components 205. In one or more embodiments, the input components can include one or more sensors with which the one or more processors 201 of the Internet-of-things device (102) can detect events (105). Alternatively, as will be explained below, in one or more embodiments a central console unit (100) can employ the sensors to determine the locations of one or more system users selected from a plurality of predefined system users, the activities of these system users, the urgency of events (105) detected by the input components 205, the number and type of electronic devices that may be situated about the one or more system users, and so forth.

Examples of sensors included with the input components 205 include a touch sensor 206, a thermal sensor 207, an acoustic sensor 208, one or more microphones 209, image capture devices 210, state sensors 211, or other sensor devices. The input components 205 can also include one or more proximity sensors 212 to detect the presence of nearby objects, persons, or electronic devices. The input components 205 may include video input components such as optical sensors, mechanical input components such as buttons, touch pad sensors, touch-sensitive surfaces, capacitive sensors, motion sensors, and switches. The input components 205 may include an accelerometer to show vertical orientation, constant tilt and/or whether the Internet-of-things device (102) is stationary. Still other input components 205 will be obvious to those of ordinary skill in the art having the benefit of this disclosure.

In one or more embodiments, when in operation, the input components 205 can optionally detect information beyond just the events (105). For example, in one or more embodiments the input components 205 can gather information about persons or electronic devices situated within a monitoring radius about the Internet-of-things device (102). For instance, an imager can capture pictures of the one or more system users and/or the environment within the monitoring radius. The one or more processors 201 can perform facial and/or environmental recognition on such images. A depth scanner can capture depth scans of the system users and/or the environment, with the one or more processors 201 performing identifying analysis of these scans. Other techniques by which the Internet-of-things device (102) can gather information about its environment will be obvious to those of ordinary skill in the art having the benefit of this disclosure.

The one or more processors 201 can optionally be operable with one or more output components 213. Examples of output components 213 include audio and/or mechanical outputs. Other examples of output components 213 include audio output components such as speaker ports or other alarms and/or buzzers and/or a mechanical output component such as vibrating or motion-based mechanisms.

An event detection circuit 214 can be operable with the input components 205. In one or more embodiments, the event detection circuit 214 is configured to detect a predefined type of event. The event that the event detection circuit 214 is configured to detect can vary based upon application, as well as based upon the intended and designed-in functionality of the Internet-of-things device (102).

Illustrating by example, if the Internet-of-things device (102) is an Internet-of-things microwave, the event detection circuit 214 may be configured to work with the input components 205 to determine when food has completed cooking, or needs to be turned over, or is fully thawed, and so forth. If the Internet-of-things device (102) is configured as an Internet-of-things dryer, the event detection circuit 214 may be configured to work with the input components 205 to determine when a wash cycle is complete, when the wash load is unbalanced, when clothes are partially or fully dry, and so forth. Where the Internet-of-things device (102) is configured as an Internet-of-things security system, the event detection circuit 214 may be configured to work with the input components 205 to detect when intruder is in the house, among other events. Where the Internet-of-things device (102) is configured as an Internet-of-things smoke detector, the event detection circuit 214 may be configured to work with the input components 205 to determine when a fire is burning. These examples are illustrative only, as numerous other examples of events detectible by the event detection circuit 214 will be obvious to those of ordinary skill in the art having the benefit of this disclosure.

The Internet-of-things device (102) can optionally include energy storage devices, peripherals, charging circuitry, and other components 215 as well. It is to be understood that the schematic block diagram 200 of FIG. 2 is provided for illustrative purposes only and for illustrating components of explanatory Internet-of-things devices that can be used in accordance with embodiments of the disclosure. The schematic block diagram 200 of FIG. 2 is not intended to represent a complete schematic diagram of the various components that required for an Internet-of-things device. Therefore, other Internet-of-things devices may include various other components not shown in FIG. 2, or may include a combination of two or more components or a division of a particular component into two or more separate components, and still be within the scope of the present disclosure.

Figure 3:
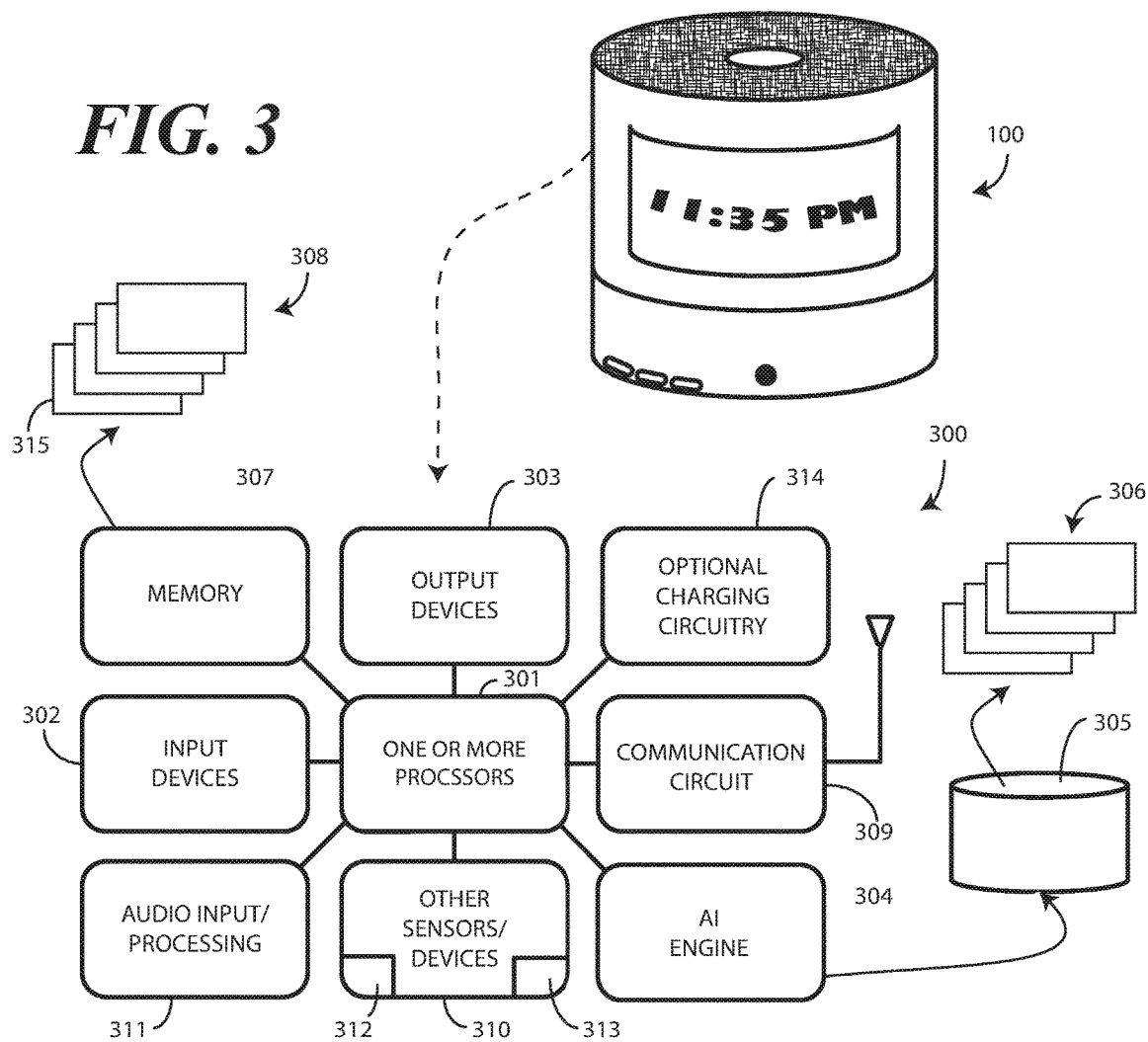
FIG. 3 illustrates one explanatory electronic device in accordance with one or more embodiments of the disclosure.

Turning now to FIG. 3, illustrated therein is one explanatory schematic block diagram 300 for one explanatory central console unit 100 configured in accordance with one or more embodiments of the disclosure. In one or more embodiments, the central console unit 100 includes one or more processors 301. The one or more processors 301 can include a microprocessor, a group of processing components, one or more ASICs, programmable logic, or other type of processing device. The one or more processors 301 can be operable with the various components of the electronic devices configured in accordance with embodiments of the disclosure. The one or more processors 301 can be configured to process and execute executable software code to perform the various functions of the electronic devices configured in accordance with embodiments of the disclosure.

The central console unit 100 can optionally include user interface components, which can include one or more input components 302 and one or more output components 303 in one or more embodiments. In other embodiments, the user interface may be omitted. In still other embodiments, the one or more processors 301 may communicate with various Internet-of-things devices (102,103,104), using their input components (205) and output components (213) in addition to, or instead of, having locally integrated input components 302 and output components 303. In one or more embodiments, the one or more processors 301 can be operable with the input components and output components, be they those of the central console unit 100, those of the Internet-of-things devices (102,103,104), or a combination thereof.

Where included locally, the one or more output components 303 can include an optional display, loudspeakers, lights, or other visual or aural output devices. Similarly, the input components 302 can include one or more microphones, one or more image capture devices, depth scanners, temperature sensors, or other input devices.

In one or more embodiments, the one or more processors 301 can include, or be operable with, an AI engine 304. The AI engine 304 can be operable with the input components and output components, be they those of the central console unit 100, those of the Internet-of-things devices (102,103, 104), or a combination thereof. In one or more embodiments, the AI engine 304 is capable of machine learning, which can include a series of processes for ingesting information received from the Internet-of-things devices (102, 103,104) and finding patterns, formulas, models, or other constructs that describe the information. These processes can represent and/or generalize the information in one or more embodiments. Representation can include data evaluation, while generalization can include processing additional information. Predictions can be used to provide answers to inquiries. When an answer is given, processes predicting informational meanings, comparing predicted answers and actual answers, and updates of prediction functions in view of determined distances can occur repeatedly. These processes can be constructed as one or more workflows within the AI engine 304 in one embodiment.

Knowledge domains 306, such as an Internet-of-things knowledge domain, can be stored in a knowledge domain database 305. Inputs, control settings, and other information can be transformed via workflows or algorithms into knowledge domains 306 in the knowledge domain database 305. The AI engine 304 can perform self-learning operations using these knowledge domains 306. The AI engine 304 can perform self-learning operations using various algorithms, transforming data to an execution code level, executing algorithms, and transforming the results into knowledge as well.

In one or more embodiments, the Internet-of-things knowledge domain comprises machine-learned information. In one or more embodiments, the Internet-of-things knowledge domain may be stored in a database. In another embodiment, the Internet-of-things knowledge domain may be learned in weights used by a neural network. In another embodiment, the Internet-of-things knowledge domain may take some other form usable by machine learning algorithms.

The knowledge domain database 305 can comprise an aggregation of learned knowledge, including all information ingested by the AI engine 304. When, for example, information is abstracted and classified based on user, event, and/or domain type, the information can be transformed into machine-learned knowledge, which can be stored in the knowledge domain database 305.

In one or more embodiments, event information in the form of event notifications (106), is used as a learning aid for the AI engine 304 to improve the routing and delivery of event notifications to selected notification recipients and receiving devices, at times selected by the one or more processors 301 and/or the AI engine 304. For example, in one or more embodiments the AI engine 304 can learn user behavior patterns to better be able to identify locations of systems users, activities of system users, and electronic devices within the vicinity of system users.

In one or more embodiments, the AI engine 304 of the central console unit 100 is constantly receiving data from input components and output components, be they those of the central console unit 100, those of the Internet-of-things devices (102,103,104), or a combination thereof, as well as from event notifications (106) transmitted by the Internet-of-things devices (102,103,104). This allows the central console unit 100 to "smartly" select notification recipients, receiving devices, and delivery times for event notifications, thereby delivering the event notification to the right person, at the right time, on the right electronic device, in the right location, and with the event notification formatted so as to be most efficiently presented to the notification recipient. Thus, the AI engine 304 improves the dynamic routing and delivery capability of the central console unit 100 by actively monitoring and learning from event notifications (106), system user behavior and activities, electronic device manipulation by system users, and subsequent user action.

A storage device, such as memory 307, can optionally store the executable software code used by the one or more processors 301 during operation. The memory 307 can also house a knowledge domain database 305. The memory 307 may include either or both static and dynamic memory components, may be used for storing both embedded code and user data. The software code can embody program instructions and methods to operate the various functions of the central console unit 100 and/or AI engine 304, and also to execute software or firmware applications and modules. The one or more processors 301 can execute this software or firmware, and/or interact with modules, to provide device functionality.

In one or more embodiments, the central console unit 100 is programmed such that the one or more processors 301 and memory 307 interact with the other components of the central console unit 100 to perform certain functions. The one or more processors 301 may include or implement various modules and execute programs for initiating different activities such as identifying a notification recipient to whom an event notification should be sent from a plurality of predefined system users, selecting a receiving electronic device from at least two electronic devices belonging to the notification recipient to whom the event notification should be sent, converting the event notification from a first event notification type to a second event notification type that is receivable by the electronic device, and transmitting the event notification to the receiving electronic device. The one or more processors 301 implement the AI engine 304 in one or more embodiments.

In one or more embodiments the central console unit 100 can receive, via a communication device 309 from one or more Internet-of-things devices (102,103,104) one or more event notifications (106). From there, the one or more processors 301, optionally operating in conjunction with the AI engine 304, can identify a notification recipient to whom the event notification should be sent from a plurality of predefined system users, select a receiving electronic device from at least two electronic devices belonging to the notification recipient to whom the event notification should be sent, convert the event notification from a first event notification type to a second event notification type that is receivable by the electronic device, and cause the communication device 309 to transmit the event notification to the receiving electronic device. The AI engine 304 can then use outputs from these activities to advance its learning. In one or more embodiments, the one or more processors 301 further update an event routing and delivery log 308 with outputs of these processes to make future routing and delivery more efficient.

In one or more embodiments, the central console unit includes a communication device 309 that is configured for wireless communication, as well as optionally configured for wired communication. The communication device 309 can communicate with one or more other devices, domains, or networks. In one or more embodiments, the communication device 309 can be configured to communicate with any of the following: a wide area network, a local area network, and/or personal area network. The communication device 309 can include wireless communication circuitry, one of a receiver, a transmitter, or transceiver, and one or more antennas.

The one or more processors 301 can also optionally be operable with other components 310 of the central console unit 100. Where included, the other components 310 can include one or more sensors. For example, the other components 310 can include an acoustic detector 311, such as a microphone. The other components 310 can also include one or more proximity sensors 312 to detect the presence of nearby objects. The other components 310 may include video input components 313 such as optical sensors, mechanical input components such as buttons, touch pad sensors, touch screen sensors, capacitive sensors, motion detectors, and switches.

In one or more embodiments, the central console unit 100 includes optional charging circuitry 314 that allows it to function like a charging dock. In one or more embodiments, the central console unit 100 includes an inductive charging surface that is devoid of electrical contacts and that allows charging of an electronic device in any orientation when placed upon the inductive charging surface. The charging circuitry 314 can deliver voltage and/or current to an electrical coupler of the central console unit 100 to allow a user to charge, for example, a mobile device by coupling the mobile device to, or placing the mobile device on, the central console unit 100.

It is to be understood that the central console unit 100 of FIG. 3 is illustrative only, and is not intended to be a complete schematic diagram of the various components required to construct a central console unit 100 configured in accordance with one or more embodiments of the disclosure. Therefore, other central console units configured in accordance with embodiments of the disclosure may include various other components not shown in FIG. 3, or may include a combination of two or more components or a division of a particular component into two or more separate components, and still be within the scope of the present disclosure.

Turning now back to FIG. 1, the Internet-of-things devices 102,103,104 are illustratively operating within an environment within which the central console unit 100 is situated. In some embodiments, the central console unit 100 and/or the Internet-of-things devices 102,103,104 can optionally be in communication with remote electronic devices across a network through a communication hub 108, which is illustratively shown in FIG. 1 as a router. Examples of these remote electronic devices include "cloud" servers that deliver data through the communication hub 108 to effect services at the various Internet-of-things devices 102, 103,104.

Illustrating by example, an example of one such remote electronic device may be a cloud-based, music streaming service that delivers music through the communication hub 108 to Internet-of-things device 102, which may be an Internet-of-things wireless loudspeaker in one instance. In one or more embodiments, the central console unit 100 can optionally function as a control gateway for each of the Internet-of-things devices 102,103,104 by connecting each Internet-of-things devices 102,103,104 to the proper remote electronic device where applicable. The central console unit 100 can also optionally deliver control signals 109 to the Internet-of-things devices 102,103,104 to control the same. These control signals 109 can cause Internet-of-things devices 102,103,104 to start functioning, cease functioning, select content for delivery, adjust settings such as volume, brightness, contrast, treble, and bass, and so forth.

In one or more embodiments, when any one or more of the Internet-of-things devices 102,103,104 detects an event 105 using its input components (205) or sensors, the detecting Internet-of-things device delivers an event notification 106 to the central console unit 100. The event notifications 106 can take any of a variety of forms, depending upon the type of Internet-of-things device 102,103,104 sending the event notification 106. For example, an Internet-of-things microwave may deliver an event notification signal that the popcorn is done, while an Internet-of-things dryer may send an event notification signal that the clothes are dry. An Internet-of-things security system may send an event notification signal that an intruder is in the house, while an Internet-of-things smoke detector may send an event notification signal that the house is on fire. Other examples of event notifications 106 will be obvious to those of ordinary skill in the art having the benefit of this disclosure.

In one or more embodiments, the event notification 106 identifies the type of event 105. For example, if the Internet-of-things device 102 is a smart microwave, the event 105 detected may be the fact that the microwave has finished its cooking cycle. Similarly, if the Internet-of-things device 103 is a smart acoustic sensor, the event 105 detected may sounds indicating that someone is knocking at the door. Other examples of events 105 detected by the various Internet-of-things devices 102,103,104 will be obvious to those of ordinary skill in the art having the benefit of this disclosure.

In addition to identifying the event 105, the event notification 106 can include other information as well. Examples of this additional information include the time of the event 105, the severity of the event 105, characteristics of the event 105, the urgency 123 of the event 105, any remedial action that is occurring in response to the event 105, whether one or more predefined users of the system are aware of the event 105, any responses received by the Internet-of-things device 102,103,104 in response to the event 105, or other information. In one or more embodiments, the central console unit 100 receives these event notifications 106 in the form of electronic communication signals transmitted from the Internet-of-things devices 102,103,104 while in operation.

Where the central console unit 100 includes an AI engine (304), the AI engine (304) can process the event notifications 106 to transform them into machine-learned knowledge relating to the one or more Internet-of-things devices 102, 103,104 that are in communication with the central console unit 100. For example, the AI engine (304) can receive event notifications 106 from the one or more Internet-of-things devices 102,103,104 and transform the information included with the event notifications 106 into machine-learned knowledge kept in an Internet-of-things knowledge domain stored in the memory (307) of the central console unit 100. Similarly, the AI engine (304) can receive inputs from the one or more Internet-of-things devices 102,103,104 and can transform the inputs into machine learned knowledge stored in the memory (307) identifying persons from the plurality of predefined system users 113 associated with past events (315). In one or more embodiments, identification of the notification recipient 112 to whom the event notification 110 should be sent comprises identifying a person from the machine learned knowledge who corresponds to an event 105 identified by the event notification 106.

In one or more embodiments, the central console unit 100, upon receiving an event notification 106, is then responsible for dynamically routing and delivering event notifications 110 in the form of electronic signals 111 to receiving electronic devices selected by the central console unit 100. This occurs, in one or more embodiments, as follows: First, the central console unit 100 identifies a notification recipient 112 to whom the event notification 110 should be sent from a plurality of predefined system users 113. Using a home as an example, in one or more embodiments the central console unit 100 may select which family member should be notified of a particular event from the plurality of predefined system users 113 defined by the family itself. In an office setting, the central console unit 100 may identify a notification recipient 112 or recipients from the plurality of predefined system users 113 defined by employees and agents of the business, and so forth.

Second, the central console unit 100 selects a receiving electronic device 114 from at least two electronic devices 115 belonging to the notification recipient 112 to whom the event notification 110 should be sent. In one or more embodiments, the one or more processors (301) of the central console unit 100 select a receiving electronic device 114 from at least two electronic devices belonging to, or near to, the notification recipient 112 to whom the event notification 110 should be sent.

Third, the central console unit 100 converts 116 the event notification 106 received from the one or more Internet-of-things devices 102,103,104 from a first event notification type 117 to a second event notification type 118 that is receivable by the receiving electronic device 114. Embodiments of the disclosure optionally determine the format and timing for delivery of the event notification 110, and thereafter deliver the event notification 110.

In one or more embodiments, one or more processors (301) of the central console unit 100, after selecting the receiving electronic device 114 from at least two electronic devices belonging to, or near to, the notification recipient 112, convert the event notification from a first type to a second type that is receivable by the receiving electronic device 114. Illustrating by example, if an Internet-of-things oven transmits a event notification signal in computer code that indicates a head of cauliflower is completely baked, and a person is in a room without a visible display, but which includes one or more Internet-of-things loudspeakers or voice assistant, one or more processors (301) of the central console unit may 100 convert the computer code to signals used to generate analog audio saying, "Buster, your cauliflower is ready." Finally, the central console unit 100 transmits 119 the event notification 110, in the format defined by the second event notification type 118, to the receiving electronic device 114.

In one or more embodiments, the one or more processors (301) of the central console unit 100 perform preliminary operations to ensure that the conversion of the received event notification 106 from the first type 117 to the second type 118, which yields the event notification 110 to be delivered to the receiving electronic device 114, occurs properly. For example, in one or more embodiments the one or more processors (301) of the central console unit 100 first identify an output capability 124 of the receiving electronic device 114 device belonging to the notification recipient 112 to whom the event notification 110 should be sent. If, for instance, the receiving electronic device 114 is an Internetof-things speaker with no display, the second type 118 of the event notification 110 should be such that the event notification 110 can be delivered acoustically. By contrast, if the receiving electronic device 114 is an Internet-of-things refrigerator with a display but no loudspeaker, the second type 118 of the event notification 110 should be such that the event notification 110 can be presented on the display in a visual format. Accordingly, in one or more embodiments the conversion of the received event notification 106 from the first event notification type 117 to the second event notification type 118 occurs as a function of the output capability of the receiving electronic device 114 belonging to the notification recipient 112.

Where multiple devices are in a particular location, in one or more embodiments the one or more processors (301) of the central console unit 100 will select a device as the receiving electronic device 114 when the notification recipient 112 is already interacting with that device. If, for example, the notification recipient 112 is in the living room with an Internet-of-things television, an Internet-of-things sound system, and a smartphone, but is watching the big game on the Internet-of-things television, in one or more embodiments the one or more processors (301) of the central console unit 100 will select the Internet-of-things television as the receiving electronic device 114 due to the fact that the user is already looking at it. Thus, in one or more embodiments the one or more processors (301) of the central console unit 100, using one or more imagers of the one or more Internet-of-things devices 102,103,104, or alternatively one or more imagers of the central console unit 100, identify a field of view 125 of the notification recipient 112 to whom the event notification 110 should be sent and then select the receiving electronic device 114 as a function of the field of view 125.

In addition to these four basic steps, in one or more embodiments the one or more processors (201) of the central console unit 100 can perform additional operations as well. It will be recognized that many of these additional operations require inputs from sensors such as imagers, depth scanners, microphones, proximity detectors, or other sensory components. As described above with reference to FIG. 3, such sensory components can be integrated into the central console unit 100 as input components (302), with the one or more processors (301) of the central console unit 100 receiving signals from the input components (302) to acquire information necessary to perform the operations.

Alternatively, in other embodiments the one or more processors (301) of the central console unit 100 may communicate with the Internet-of-things devices 102,103,104 to access their input components (205) to acquire information necessary to perform the operations. Of course, a combination of the two could be used as well. Thus, it should be understood that when performing operations such as determining an activity 120 of the notification recipient 112 or a location 121 of the notification recipient 112, the one or more processors (301) of the central console unit 100 may make such determinations using onboard sensors, sensors of the Internet-of-things devices 102,103,104 or other devices with which the central console unit is in communication, or a combination thereof.

In one or more embodiments, the one or more processors (301) of the central console unit 100 further determine a location 121 of the notification recipient 112 to whom the event notification 110 should be sent. Determining this location 121 allows the central console unit 100 to do two things. First, it informs the central console unit 100 regarding how to deliver the event notification 110. If, for example, the central console unit 100 is situated in the home of the notification recipient 112 and the notification recipient 112 is away, the central console unit 100 may deliver the event notification 110 across a wide area network. By contrast, if the notification recipient 112 is within the home, the central console unit 100 may deliver the event notification 110 across a local area network, and so forth.

Second, determining the location 121 of the notification recipient 112 to whom the event notification 110 should be sent can assist in selecting the receiving electronic device 114 as well. Where such a location 121 is determined, in one or more embodiments the selection of the receiving electronic device 114 can occur as a function of the location 121 of the notification recipient 112.

If, for instance, the notification recipient 112 is in a living room with an Internet-of-things music player and an Internet-of-things television, the one or more processors (301) of the central console unit 100 may select the Internet-of-things television as the receiving electronic device 114 due to the fact that the second event notification type 118 comprises a text message event notification. By contrast, the central console unit 100 may select the Internet-of-things music player as the receiving electronic device 114 when the second event notification type 118 is acoustic in nature.

In one or more embodiments, the one or more processors (301) of the central console unit 100 also identify an activity 120 being performed by the notification recipient 112 to whom the event notification 110 should be sent. In one or more embodiments, this activity 120, where determined can be used in multiple ways. First, the activity 120 being performed by the notification recipient 112 to whom the event notification 110 should be sent can be used as an input to a function used to select the receiving electronic device 114. Said differently, in one or more embodiments the selection of the receiving electronic device 114 occurs as a function of the activity 120 being performed by the notification recipient 112.

Illustrating by example, if the notification recipient 112 is watching an Internet-of-things television with a smartphone situated on a nearby table, the one or more processors (301) of the central console unit 100 may select the Internet-of-things television as the receiving electronic device 114 due to the fact that the notification recipient 112 is already looking at this device, and is not looking at the smartphone.

Similarly, if the notification recipient 112 has a mobile device, such as a smartphone or tablet computer within reach, but the current activity 120 of the notification recipient 112 prevents them from accessing this device, e.g., when showing, in one or more embodiments the one or more processors (301) of the central console unit 100 may select an Internet-of-things speaker or music player to deliver an event notification 110 audibly.

Alternatively, the one or more processors (301) of the central console unit 100 may still select the mobile device, but may configure the format of the event notification 110 differently, e.g., by using a voice assistant of the mobile device to ask the notification recipient 112 whether they would like to have the event notification 110 read aloud and/or whether the notification recipient 112 would like to deliver a reply by voice command.

Of course, a combination of the location 121 of the notification recipient 112 and the activity 120 of the notification recipient 112 can be used in combination as well. For example, if the notification recipient 112 has a preferred notification device, e.g., a personal smartphone, but that device is in another location, e.g., another room, the one or more processors (301) of the central console unit 100 may select a different device that is proximately located with the notification recipient 112 as the receiving electronic device 114. The one or more processors (301) of the central console unit 100 may deliver the event notification 110 to a computer monitor upon which the notification recipient 112 is gazing.

Alternatively, the one or more processors (301) of the central console unit 100 may deliver the event notification 110 to an Internet-of-things speaker or voice assistant. In situations where multiple displays were situated at the location 121 of the notification recipient 112, such as would be the case if the notification recipient 112 were watching a game on television while surfing the web on a tablet computer, the one or more processors (301) of the central console unit 100 may select the display at which the notification recipient was actually looking, and so forth.

A second use for the activity 120 of the notification recipient 112 relates to when the one or more processors (301) of the central console unit 100 elect to transmit the event notification 110 to the receiving electronic device 114. In one or more embodiments, the one or more processors (301) of the central console unit 100 delay 122 the transmitting of the event notification 110 as a function of the activity 120 being performed by the notification recipient 112.

Illustrating by example, if the notification recipient 112 starts a load of laundry, but then decides to take a nap, in one or more embodiments when the event notification 110 indicates that the laundry cycle is complete, the one or more processors (301) of the central console unit 100 may first identify the activity 120 of the notification recipient 112 as that of sleeping. Accordingly, to avoid waking the notification recipient 112, the one or more processors (301) of the central console unit 100 may insert a delay 122 as a function of this activity 120. Once the delay 122 has expired, the central console unit 100 can transmit the event notification 110 to the receiving electronic device 114 of the notification recipient 112.

The activity 120 of the initially selected notification recipient can be used to select other notification recipients as well. For instance, if the husband of a family starts making dinner, but then goes to take a shower, when an Internet-of-things cookware device transmits an event notification 106 indicating that dinner is ready, one or more processors (301) of the central console unit 100 may identify the wife of the family as the notification recipient 112 due to the fact that the wife is in a room adjacent to the kitchen (location 121), combined with the fact that the husband's current activity 120 temporarily precludes him from responding to the event notification 110.

In one or more embodiments, the one or more processors (301) of the central console unit 100 also determine an urgency 123 associated with the event notification 106 received from the one or more Internet-of-things devices 102,103,104. The urgency 123 can be determined in a variety of ways. In one embodiment, the urgency 123 is determined from the content of the event notification 106 itself. Illustrating by example, if the Internet-of-things device 104 transmitting the event notification 106 is an Internet-of-things smoke detector, faint detection of smoke may be other than an urgent event notification, while a strong detection of smoke combined with detection of high heat may constitute an urgent event notification.

In other embodiments, the one or more processors (301) of the central console unit 100 may determine the urgency 123 using sensors of either the central console unit 100 or of the Internet-of-things devices 102,103,104. If, for example, an Internet-of-things security system transmits an event notification 106 indicating that a glass break has occurred, the one or more processors (301) of the central console unit 100 may control a camera of the Internet-of-things security system to determine whether an intruder is in the home. A glass break event notification may be other than urgent when the glass break is caused by an errant baseball, for example, while the one or more processors (301) of the central console unit 100 detecting an intruder in the home with sensors of the Internet-of-things security system may constitute an urgent event notification, and so forth. Other techniques for determining the urgency 123 of the received event notification 106 will be obvious to those of ordinary skill in the art having the benefit of this disclosure.

Once the urgency 123 has been determined, it can be used in a variety of ways. In one or more embodiments, the one or more processors (301) of the central console unit 100 may override the delay 122 in transmitting of the event notification 110 when the urgency 123 of the event notification 106 indicates an urgent notification.

Embodiments of the disclosure contemplate that some event notifications will be more urgent than others. An event notification indicating that clothes are dry will have a lower urgency, for example, than an event notification signal indicating that the house is on fire. Accordingly, if a husband and wife live in a home, and the wife is traveling, and the husband is taking a nap, while the one or more processors (301) of the central console unit 100 may ordinarily not send an event notification 110 to the husband (or delay 122 it) due to the fact that he is sleeping, the one or more processors (301) may override the delay 122 and send the husband the event notification a function of the urgency 123, e.g., if he is sleeping in a house that is on fire. Said differently, if the notification recipient 112 is sleeping and the event notification 110 is other than an urgent notification, the one or more processors (301) of the central console unit 100 may delay 122 transmitting the event notification 110 until the morning. However, if the notification recipient 112 is sleeping and the event notification 106 is an urgent event notification, the one or more processors (301) of the central console unit 100 may override the delay 122 and transmit the event notification 110 immediately, thereby waking the notification recipient 112.

Figure 4:
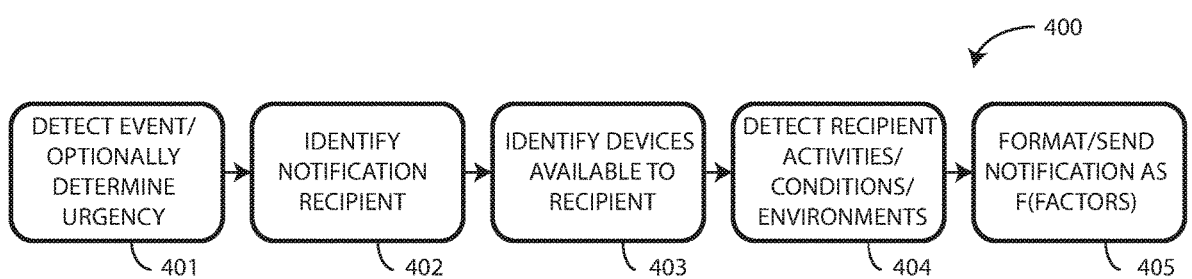
FIG. 4 illustrates one explanatory method in accordance with one or more embodiments of the disclosure.

Turning now to FIG. 4, illustrated therein is a method 400 for an electronic device configured in accordance with one or more embodiments of the disclosure that outlines the functions described above with reference to FIG. 1. The method 400 could, for example, be implemented as one or more software modules stored in a memory (307) of a central console unit (100) for execution by one or more processors (301) of the central console unit 100.

Beginning at step 401, the method 400 comprises receiving, with a communication device communicating with one or more Internet-of-things devices, an event notification detected by the one or more Internet-of-things devices. Optionally, step 401 can further include determining, with one or more processors operable with the communication device, an urgency of the event notification.

At step 402, the method 400 selects, with the one or more processors, at least one notification recipient from a plurality of system users as a function of the event notification. Examples of functions of the event notification will be described below with reference to FIG. 5. Step 402 can also include determining an activity being performed by the notification recipient as well.

At step 403, the method 400 identifies, optionally using one or more sensors of one or more Internet-of-things devices, a plurality of electronic devices available to the at least one notification recipient. At step 404, the method determines, again optionally using one or more sensors of the one or more Internet-of-things devices, at least one notification recipient activity being performed by the at least one notification recipient.

At step 405, the method 400 takes multiple actions. A first action taken at step 405 comprises selecting, with the one or more processors, a receiving electronic device to receive the event notification as a function of the at least one notification recipient activity. A second action taken at step 405 comprises converting, with the one or more processors, the event notification from a first event notification type to a second event notification type that is receivable by the receiving electronic device. A third action taken at step 405 comprises transmitting, with the communication device, the event notification to the receiving electronic device.

Step 405 can also optionally include delaying, with the one or more processors, the transmitting as a function of the at least one notification recipient activity where such an activity is determined at step 402. This step 405 of delaying can also occur as a function of the urgency of the event notification when the same is determined at step 401. For example, step 405 can comprise delaying the transmitting of the event notification to the another receiving electronic device where the event notification is other than an urgent event notification.

Thus, as shown and described in FIGS. 1 and 4, electronic devices and methods configured in accordance with embodiments of the disclosure generally perform four fundamental steps when performing the dynamic routing and delivery of event notifications. First, they, from at least one Internet-of-things device, an event notification. Second, they determine to which user or users the event notification should be sent. Third, they determine an output device belonging or near to the notification recipient to which the event notification should be sent. Fourth, embodiments of the disclosure determine the format and timing for delivery of the event notification, and thereafter deliver the event notification. This last step can include the insertion of delays prior to transmitting. The last step can further be a function of one or more factors, including activities being performed by the event notification recipient, the urgency of the event notification, or other factors.

Performing these four fundamental operations, embodiments of the disclosure can dynamically route and deliver event notifications in unique ways so as to automatically further satisfy preferences of the notification recipient. It should be noted that each of the steps 402,403,404,405 of the method 400 of FIG. 4 can be performed in a variety of different ways. Turning now to FIGS. 5-8, illustrated therein are some examples of how these steps 402,403,404,405 can be performed. Still others will be obvious to those of ordinary skill in the art having the benefit of this disclosure.

Figure 5:
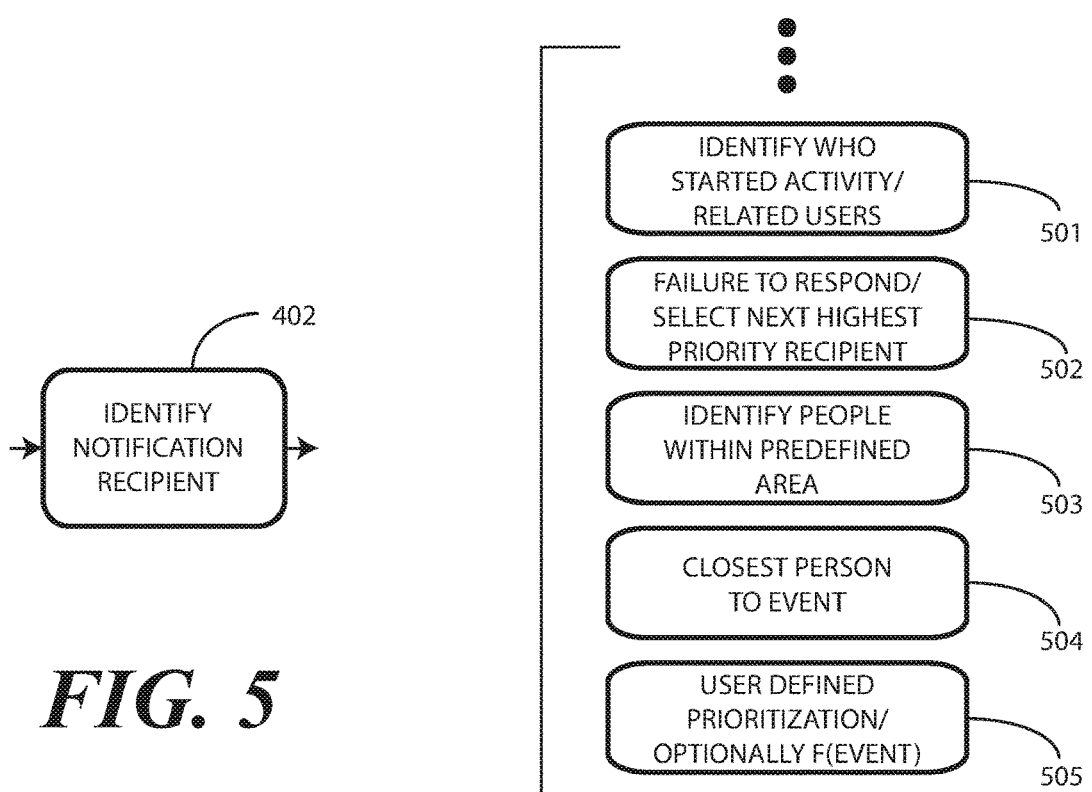
FIG. 5 illustrates one or more method steps in accordance with one or more embodiments of the disclosure.

Beginning with FIG. 5, the step 402 of determining to which user or users the event notification should be sent can be performed in a variety of ways. In one embodiment, this step 501 can include identifying the person who started the activity resulting in the event notification being sent. For example, if the event notification indicates that a roast is finished cooking, the step 501 of identifying the notification recipient to whom this event notification should be sent can include identifying the person who initiated the cooking process. In one or more embodiments, this information can be obtained from the Internet-of-things device sending the event notification. Using this cooking illustration as an example, an Internet-of-things stove may identify who causes a cooking process to start, and may then include the identification of that person in the event notification.

The Internet-of-things device delivering the event notification can determine who started the activity triggering the event notification in a variety of ways. In one embodiment, the person starting the activity may have on their person a personal electronic device, such as a smartphone, that is equipped with a wireless local area communication device, such as a Bluetooth.sup.™ communication device. Such signals include a signature that can be read by the Internet-of-things device detecting the initiation of the activity. By comparing the signature to a database of predefined system users, the Internet-of-things device can identify who commences the activity triggering the event notification.

In another embodiment, one or imagers can be used to determine who commences the activity. For instance, if the Internet-of-things device performing the activity includes an imager, it can capture one or more images of the person initiating the activity. These images can be sent to the central console unit, which can perform image analysis to identify the person.

In yet another embodiment, the Internet-of-things device performing the activity may have an audio capture device, such as a microphone. Where it does, it may be able to capture voice signals from the person initiating the activity. These signals can be sent to the central console unit, which can perform voice print audio analysis to identify the person. Other techniques for identifying which person initiated an activity will be obvious to those of ordinary skill in the art having the benefit of this disclosure.

Accordingly, in one or more embodiments the step 501 of identifying the notification recipient to whom an event notification should be sent comprises receiving, from the at least one Internet-of-things device, an electronic communication identifying a person commencing an activity causing the event notification. Thereafter, step 501 selects the person commencing the activity causing the event notification as the notification recipient to whom the event notification should be sent.

Step 501 can also include the complement of this process as well. For example, if the wife of a family commences the cooking process, but then leaves the home, she will be unable to respond to an event notification indicating that the roast is done. However, by identifying the fact that the husband of the family is home, step 501 can dynamically route and deliver the event notification to him to prevent the roast from being burned.

Accordingly, in another embodiment step 501 comprises receiving, from the at least one Internet-of-things device, an electronic communication identifying a person commencing an activity causing the event notification. Thereafter, step 501 includes identifying the notification recipient to whom the event notification should be sent by selecting another person related to the person commencing the activity causing the event notification, rather than the person commencing the activity, from a plurality of persons related to the person commencing the activity causing the event notification.

In another embodiment, the selection of the notification process can be iterative. Illustrating by example, at step 502 the selection process comprises initially sending an event notification to a first notification recipient. However, if the first notification recipient fails to respond, step 502 can include selecting a different notification recipient.

Accordingly, in one or more embodiments step 502 comprises failing to receive, with a communication device, a response from the receiving electronic device after the transmitting of the event notification. Thereafter, step 502 comprises selecting, with one or more processors, at least one other notification recipient from the plurality of system users, identifying, with one or more sensors, another plurality of electronic devices available to the at least one other notification recipient, optionally determining, from the one or more sensors, at least one other notification recipient activity being performed by the at least one other notification recipient, selecting, with the one or more processors, another receiving electronic device to receive the event notification as a function of the at least one other notification recipient activity, and transmitting, with the communication device, the event notification to the other receiving electronic device.

In another embodiment, the selection of the notification recipient can include identifying which people are within a predefined area at step 503. If, for example, the event notification indicates that there is a knock at the front door, step 503 can include determining which people are in the living room adjacent to the front door. Step 503 can then include selecting one or all of the people in the living room as the notification recipients.

Step 504 can take this location-based selection a step further by identifying the person closest to the event giving rise to the event notification as the event recipient. Accordingly, in one or more embodiments step 504 comprises, where the event notification identifies a location of an event identified by the event notification, determining which person from a plurality of predefined system users is closest to the location of the event and selecting them as the notification recipient. This prevents a person upstairs from being notified about a knock at the door when another person is downstairs eating popcorn right next to the door.

In still another embodiment, rules identifying a priority of notification recipients as a function of the event being detected at step 505. The plurality of system users may adjust user settings in an electronic device such that certain events triggering event notifications be delivered initially to certain users. In one or more embodiments, step 505 comprises selecting a first person from a plurality of predefined system users when the activity is of a first type and selecting a second person from the plurality of predefined system users when the activity is of a second type. Illustrating by example, home invasion event notices may be requested to be directed a husband of a family, while fire event notices are directed to a wife of the family, and laundry event notices are directed to the children of the family, and so forth.

Figure 6:
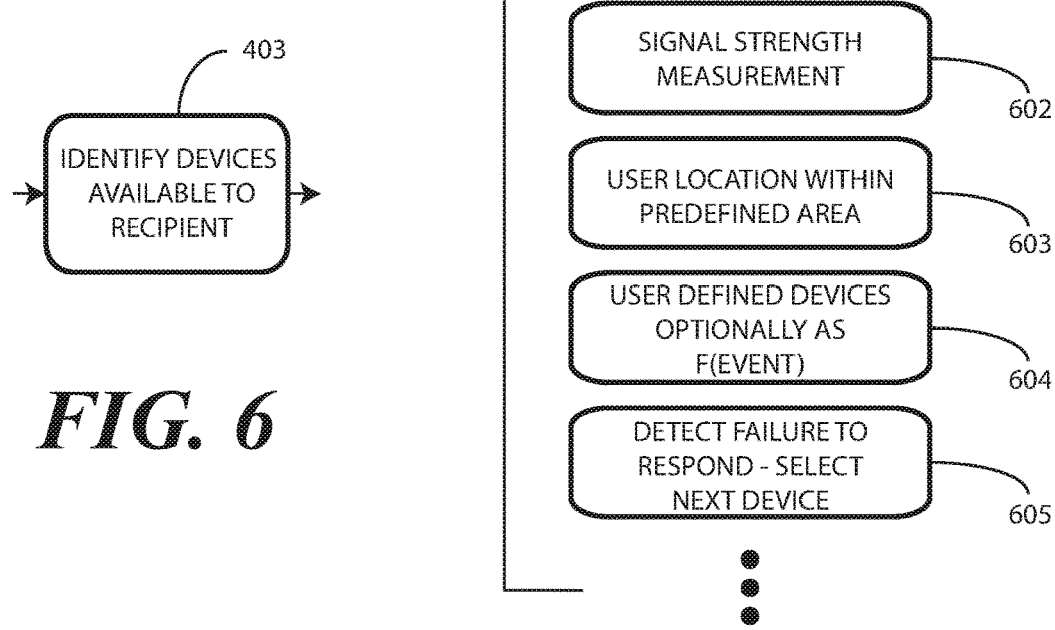
FIG. 6 illustrates one or more method steps in accordance with one or more embodiments of the disclosure.

Just as the identification of the notification recipient can be performed in several ways, so too can the function of identifying the receiving electronic device from the at least two electronic devices belonging to the notification recipient to whom the event notification should be sent, or alternatively, from a plurality of electronic devices available to the notification recipient. Turning now to FIG. 6, illustrated therein are several ways in which this step 403 can occur.

Beginning with step 601, in one embodiment the at least two electronic devices belonging to the notification recipient to whom the event notification should be sent or the plurality of electronic devices available to the notification recipient can be determined by visual inspection. For example, a central console unit can coordinate with one or more imagers of one or more Internet-of-things devices, or alternatively can use its own imagers, to capture images of an area in which the notification recipient is located. Image analysis can then be performed on those images to identify the number and types of devices. The receiving electronic device can then be selected from these devices.

In another embodiment, step 602 can comprise taking signal measurements, such as the received signal strength indication, to determine which electronic devices are within a predefined environment. When received signals having a signal strength above a predefined threshold are detected, a communication device of a central console unit can query these devices to determine their identities. The receiving electronic device can then be selected from these devices.

In another embodiment, step 603 can include accessing a database and determining which electronic devices are available to a notification recipient as a function of location. If, for example, a person is detected as being in a living room, one or more processors of a central console unit might access a table of devices known to be in the living room, such as an Internet-of-things television, an Internet-of-things music player, and so forth. The receiving electronic device can then be selected from these devices.

Step 604 can include identifying a receiving electronic device as a function of the event triggering the event notification. For example, for an urgent event notification such as one in response to detected fire or home invasion, step 604 can include selecting a receiving electronic device having both visual and audible outputs, as doing so will allow acoustic signals to alert the notification recipient to the fact that the event notification has been received while providing additional details in the form of images and/or text on the visual output.

Step 605 can include selecting the receiving electronic device when there is a failure to receive a response to a delivered event notification. In such an embodiment, the step 605 of selecting of the receiving electronic device becomes iterative. If, for example, step 605 comprises initially sending an event notification to a first receiving electronic device with that receiving electronic device failing to respond to the event notification, step 605 can include selecting a different receiving electronic device.

Accordingly, in one or more embodiments step 605 comprises failing to receive, with a communication device, a response from the receiving electronic device after the transmitting of the event notification. Thereafter, step 605 comprises selecting, with one or more processors, at least one other receiving electronic device belonging or available to the notification recipient and transmitting, with the communication device, the event notification to the other receiving electronic device.

Turning now to FIG. 7, illustrated therein are various ways in which the step 404 of detecting activities being performed by the notification recipient can be detected. At step 701, the activity of the notification recipient can be detected by visual inspection. For example, a central console unit can coordinate with one or more imagers of one or more Internet-of-things devices, or alternatively can use its own imagers, to capture images of the notification recipient. Image analysis can then be performed on those images to identify the activity being performed by the notification recipient.

At step 702, acoustic signals can be used in the same fashion. In one or more embodiments, a central console unit can coordinate with one or more microphones of one or more Internet-of-things devices, or alternatively can use its own microphones, to capture sounds of an area in which the notification recipient is located. Acoustic analysis can then be performed on those sounds to identify the same. A person who is snoring, for example, will be identified as sleeping. By contrast, the sound of running water can indicate a person is showering, and so forth.

At step 703, the activity of the notification recipient can be detected by communicating with companion devices. Illustrating by example, a smart watch or heart rate monitor can detect a notification recipient's heart rate or other vital signals. These signals can be processed to determine whether the notification recipient is engaged in hard physical activity, sleeping, or performing another activity. Moreover, the companion device can also detect location and motion to identify, for example, whether the notification recipient is still, walking, running, in a car, or on an airplane, or alternatively running on a treadmill in the basement.

At step 703, the activity can be learned by an AI engine in the form of machine knowledge from a notification recipient's prior behaviors. If, for example, a particular person has coffee in the kitchen at the same time every day, this repetitive behavior can be learned by the AI engine such that the AI engine can use it as a predictor of future behavior, and so forth.

Turning now to FIG. 8, illustrated therein are optional ways in which the step 405 of formatting and delivering the event notification to the receiving electronic device belonging to the notification recipient can be performed. Beginning with step 801, the type of receiving electronic device can affect how the step 405 of converting the event notification from a first event notification type to a second event notification type that is receivable by the electronic device will occur. If, for example, the receiving electronic device only has an audio output, the event notification will need to be formatted for acoustic presentation. By contrast, if the receiving electronic device has only a display but no audio output, the event notification will need to be formatted for visual presentation, and so forth.

As shown at step 802, the timing of the delivery of the event notification can be affected by whether a delay is inserted prior to delivery. As described above, in one or more embodiments transmission of an event notification may be delayed as a function of the activity being performed by the notification recipient. However, as shown at step 803, this delay may be overridden when the event notification is an urgent notification.

Whether the notification recipient has the receiving electronic device operating on the same network as a central console unit, or alternatively on a different network, can affect how the conversion of the event notification from a first event notification type to a second event notification type that is receivable by the receiving electronic device can occur as well, as indicated at step 805. Where the receiving electronic device and the central console unit delivering the event notification are operating on the same local area network, the formatting may be of a first type. By contrast, where the central console unit is operating on a Wi-Fi network, but the receiving electronic device, situated at a remote location, is operating on a cellular network, the formatting may be of a second type, and so forth.

It should be noted that the examples of the various steps of the method of FIG. 4 shown above in FIGS. 5-8 are illustrative only. Accordingly, they are not intended to be a complete set of the various ways in which these steps could be performed in accordance with one or more embodiments of the disclosure, as numerous others will be obvious to those of ordinary skill in the art having the benefit of this disclosure. Therefore, the method steps of FIG. 4 may be performed in various other ways not shown in FIGS. 5-8, or may include a combination of two or more steps, or a division of a particular step into two or more separate steps, and still be within the scope of the present disclosure.

Figure 9:
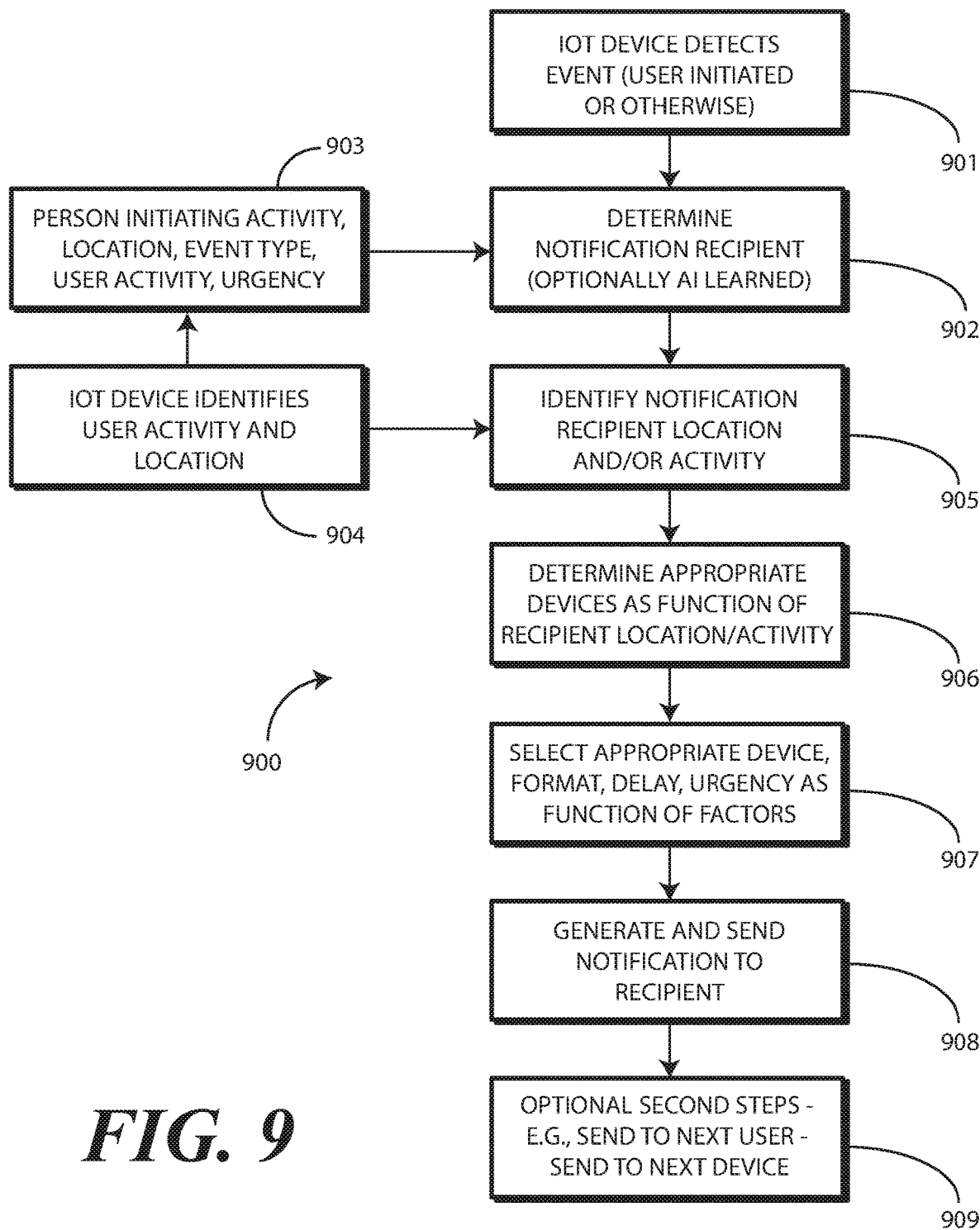
FIG. 9 illustrates another explanatory method in accordance with one or more embodiments of the disclosure.

Turning now to FIG. 9, illustrated therein is yet another method 900 for an electronic device configured in accordance with one or more embodiments of the disclosure. The method 900 is similar to the method (400) of FIG. 4 above, but includes additional details to further illustrate the many advantages offered by embodiments of the disclosure.

Beginning at step 901, in one or more embodiments an Internet-of-things device detects an event. It should ne noted that the event can be initiated by a person in one or more embodiments. For example, a user may issue a voice command or gesture command that causes the event to be detected.

However, this need not necessarily be the case. In other embodiments, the event will be detected from processes unrelated to user commands. Illustrating by example, an Internet-of-things microwave may detect an event such as the fact that food in the microwave has finished cooling. An Internet-of-things security system may acoustically detect someone knocking at the door or ringing the doorbell.

In one or more embodiments, the Internet-of-things device detecting collects signals from all sensors in the network to accurately determine the event at step 901. For instance, the Internet-of-things device detecting the event can use a combination of cameras, microphones, motion detectors, thermal sensors, and so forth to detect the events.

In one or more embodiments step 902 comprises selecting, with one or more processors operable with a communication device, at least one notification recipient from a plurality of system users as a function of the event notification. This step can occur in response to one or more input steps. For example, the same sensors used at step 901 can be used to detect if a person is within the location of the event, as well as who the person is, to identify the notification recipient at step 904.

In one or more embodiments, the one or more sensors are further used at step 903 to classify user activities and determine if the activity can be interrupted on the event's urgency level. For example, if the user is sleeping, the system should notify other users in the house. The activity detected at step 903 can optionally be detected by multiple devices in the network, e.g., by using a security camera, one or more microphones, information from a smartphone application such as the notification recipient's calendar, and so forth. In one or more embodiments this information is combined to decide the user's activity at step 903.

At step 905, the method 900 selects one or more receiving notification devices. In one or more embodiments, this selection occurs as a function of the location detected at step 904 and, optionally, the type of event identified in the event notification received at step 901.

For example, in one or more embodiments the method 900 accesses a device deployment map, identifying which devices are in which locations. From this device deployment map, the method can choose the receiving electronic device from devices located within the notification recipient's vicinity and location as candidate output devices at step 906.

In one or more embodiments, if the receiving electronic device is operating in the same network as the device delivering the event notification, e.g., where a central console unit delivering an event notification and the notification recipient and their receiving electronic device are all within a home serviced by a single Wi-Fi network, the method 900 may select, at step 907, the device that can best present the event notification so that the event notification will be recognized and understood by the notification recipient. For example, if the notification recipient is situated in the living room, any Internet-of-things device located in the living room can become candidate devices at step 906, with the choice of the receiving electronic device occurring at 907. The method 900 may choose the receiving electronic device at step 907 by, for example, identifying a field of view of the notification recipient to whom the event notification should be sent, and then selecting the receiving electronic device as being the one presently within the field of view. In one or more embodiments, the gaze cone can be detected by presenting a blinking light, with one or more processors determining which device is most within the field of view of the notification recipient.

By contrast, if the receiving electronic device belonging to the notification recipient is operating on a different network, e.g., such as would be the case when the notification recipient is away from home, in one or more embodiments the selection of the receiving electronic device at step 907 may be a selection of a registered secure device that is within close proximity to the notification recipient. For example, if the notification recipient is driving, step 907 may comprise selecting a mobile phone inside the vehicle or the vehicle's communication system as the receiving electronic device.

At step 908, the method analyzes output format requirements associated with the receiving electronic device. Step 908 can comprise identifying an output capability of the receiving electronic device belonging to the notification recipient to whom the event notification should be sent. Step 908 can then include converting the event notification from a first event notification type to a second event notification type as a function of the output capability of the receiving electronic device belonging to the notification recipient. For example, if the event comprises a person issuing a voice command to "play the video to my wife," step 908 would include formatting the video for presentation on a receiving electronic device having visual and audible output capabilities. By contrast, if the event comprises a person issuing a voice command to "leave a message to my wife," step 908 can comprise formatting the event notification for a receiving electronic device having, perhaps a speaker to play the message in audible form, or alternatively to display the message on a display after transcribing the same to text, and so forth. It should be noted that the receiving electronic device selected at step 907, as well as the formatting and timing of delivery can all be determined by machine learning algorithms in one or more embodiments.

When there are multiple, equally viable electronic devices selected at step 906, step 907 can, in one or more embodiments, select the device that is best capable of presenting the event notification. In one or more embodiments, the selection of step 907 can occur as a function of one or both of an activity being performed by the notification recipient and the type of event identified by the event notification.

For example, if the notification recipient is watching an Internet-of-things television in the living room, that Internet-of-things television, an Internet-of-things sound system, and a smartphone belonging to the notification recipient may all be identified at step 906. If an Internet-of-things security camera detects suspicious activities at the front door, step 907 may comprise selecting the Internet-of-things television, with step 908 delivering the event notification to the Internet-of-things television. This selection at step 907 would be made because streaming a video of the suspicious activities to the Internet-of-things television may be more appropriate than describing the activity through the Internet-of-things sound system or causing an alarm to sound from the smartphone. By contrast, if the user is sleeping, selecting a receiving electronic device at step 907 that has audible output may be more appropriate.

In one or more embodiments, step 907 decides the proper output timing and format based on the event and user activity, as well as any constrained by the formats supported by the receiving electronic device. For example, if the user is sleeping and the dryer finished the cycle, step 908 may push an event notification to a smartphone. Alternatively, step 907 could insert a delay, with step 908 delivering the event notification at a later time when the user is awake. By contrast, step 907 may omit the delay for urgent notifications, with step 908 transmitting the event notification immediately. As such, if the front door is broken in, the receiving electronic device may make a loud alarm sound immediately, and so forth.

Figure 10:
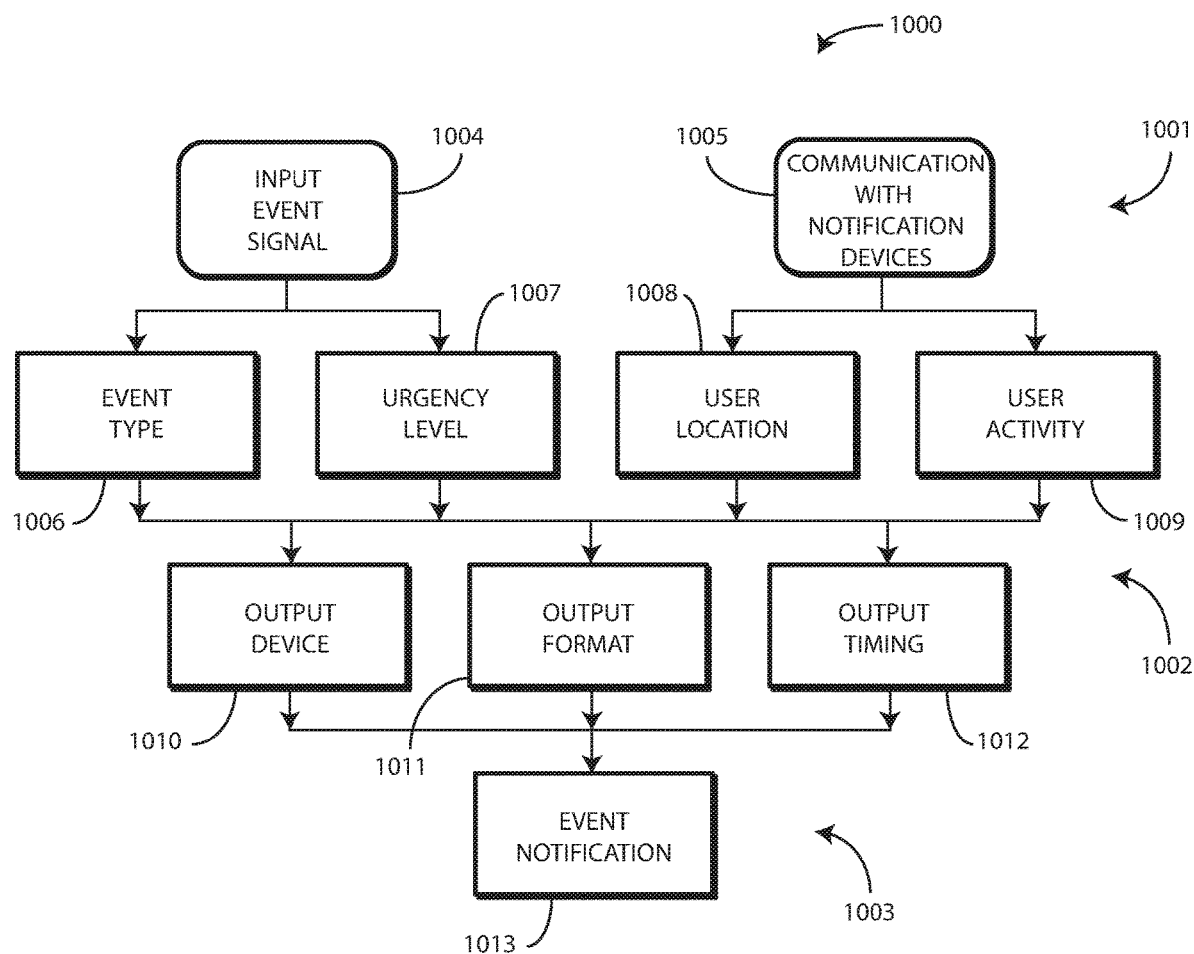
FIG. 10 illustrates one explanatory system in accordance with one or more embodiments of the disclosure.

Turning now to FIG. 10, illustrated therein is one explanatory system 1000 for dynamically routing and delivering event notifications in accordance with one or more embodiments of the disclosure. Three levels are shown in the system, with the first level illustrating inputs 1001 of the system 1000, the second level defining modifiers 1002 of the inputs, and the third level identifying output components 1003 of the system.

The inputs 1001 include the event notification 1004 received from an Internet-of-things device. The inputs 1001 also include communication signals 1005 with various electronic devices that are available for selection as receiving electronic deices. The communication signals 1005 can also include signals from from various Internet-of-things devices, such as inputs from sensors, e.g., cameras, microphones, temperature sensors, motion detectors, and so forth.

The modifiers 1002 of the inputs include event type 1006, urgency level 1007 of the event type 1006, the location 1008 of a notification recipient, and the activity 1009 of a notification recipient. The modifiers further include the receiving electronic device 1010, the format 1011 of the event notification and the output timing 1012 of the event notification. The output of the system 1000 comprises the event notification 1013.

Figure 11:
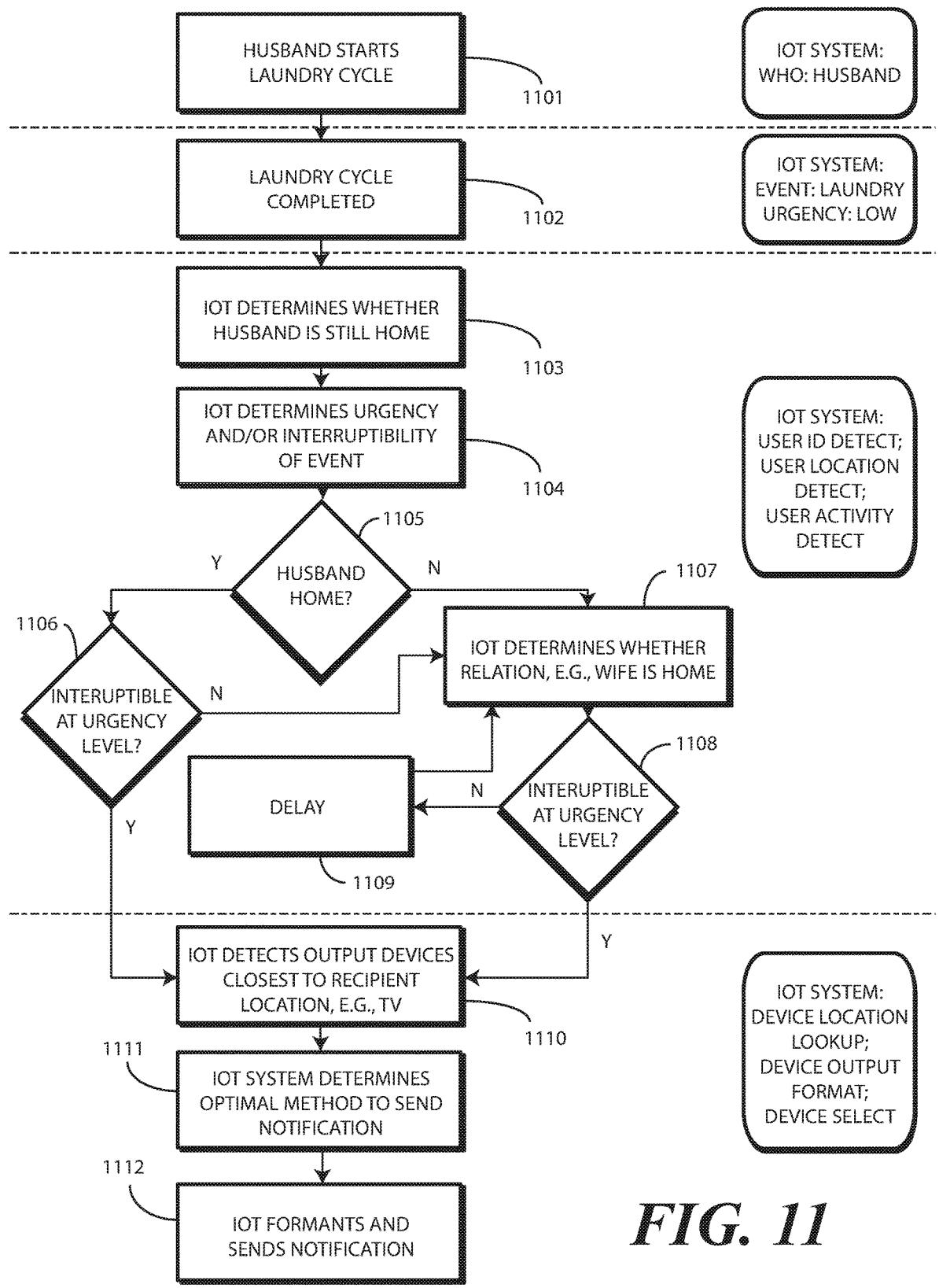
FIG. 11 illustrates one explanatory system and method in accordance with one or more embodiments of the disclosure.

Operation of the components of this system 1000 is illustrated by a use case shown in FIG. 11. Turning now to FIG. 11, at step 1101 a person starts an activity, which is detected by an Internet-of-things device of the system. In this example, the person is the husband of a family. In this example, the activity is initiating a laundry cycle. In this example, the Internet-of-things device is an Internet-of-things washing machine.

At step 1102, an event is detected. Here, the Internet-of-things washing machine detects that the laundry cycle has been completed. In addition to detecting that the laundry cycle has been completed, the Internet-of-things washing machine determined that the event is not an urgent event, i.e., it is an event other than an urgent event. Accordingly, at step 1102 the Internet-of-things washing machine sends the event notification to a central console unit.

At step 1103, the central console unit, using inputs from sensors from the various Internet-of-things devices with which it is communicating, determines a location of the person starting the activity, which in this example is the husband. In this example, step 1103 attempts to determine whether the husband is still within a vicinity of the event that triggered the event notification. In this example, step 1103 attempts to determine whether the husband is still home. Step 1103 attempts to find the husband because he is the one who started the laundry. Said differently, step 1103 attempts to find the husband because he is the person commencing the activity (starting the laundry) causing the event notification (laundry is done).

At step 1104, the central console unit determines the urgency associated with the event notification received from the Internet-of-things washing machine. In this example, the central console unit performs this operation by extracting information from the received event notification. In this example, that information indicates that the urgency associated with the event is low.

If the husband is home, as determined at decision 1105, decision 1106 determines whether an activity being performed by the husband is interruptible in view of any activity in which the husband is participating. If, for example, the husband took a nap, it would not be worth interrupting the nap to inform the husband that the laundry is done. Accordingly, step 1107 would attempt to locate an alternate notification recipient.

By contrast, if the husband's activity is interruptible given the urgency level, step 1110 selects a receiving electronic device from at least two electronic devices belonging to the husband. If, for example, there were an Internet-of-things camera, an Internet-of-things light bulb, an Internet-of-things speaker, and an Internet-of-things television all near the husband, step 1110 might select the Internet-of-things speaker as the receiving electronic device.

Step 1111 determines the optimal method for sending the event notification. In this example, since the event notification is being sent to an Internet-of-things speaker, the optimal method for sending the event notification is as an audible alert saying, "the laundry is done," through the Internet-of-things speaker. Step 1112 then converts the event notification from a first event notification type to a second event notification type that is receivable by the electronic device and transmits the event notification to the receiving electronic device.

If the husband had not been home, as determined at decision 1105, or alternatively if the husband had been home but was engaged in an activity that was not interruptible in view of the urgency of the event notification, step 1107 would attempt to select a second notification recipient. In this example, step 1107 selects another person (here, the wife) related to the person commencing the activity causing the event notification (here, the husband) from a plurality of persons related to the person commencing the activity causing the event notification, e.g., the wife, the kids, the in-laws, etc.

The process could repeat until someone was found within the home. However, for simplicity, assuming only the husband and the wife live in the household, and assuming that the wife is home, decision 1108 determines whether an activity being performed by the wife is interruptible in view of any activity in which the husband is participating. If so, step 1110 selects a receiving electronic device from at least two electronic devices belonging to the wife. Step 1111 determines the optimal method for sending the event notification. Step 1112 then converts the event notification from a first event notification type to a second event notification type that is receivable by the electronic device and transmits the event notification to the receiving electronic device.

However, if the wife is home but was engaged in an activity that was not interruptible in view of the urgency of the event notification, step 1107 would delay the transmitting of the event notification as a function of the activity being performed by the wife. Once the delay passed, step 1107 would cause the method to repeat.

Figure 12:
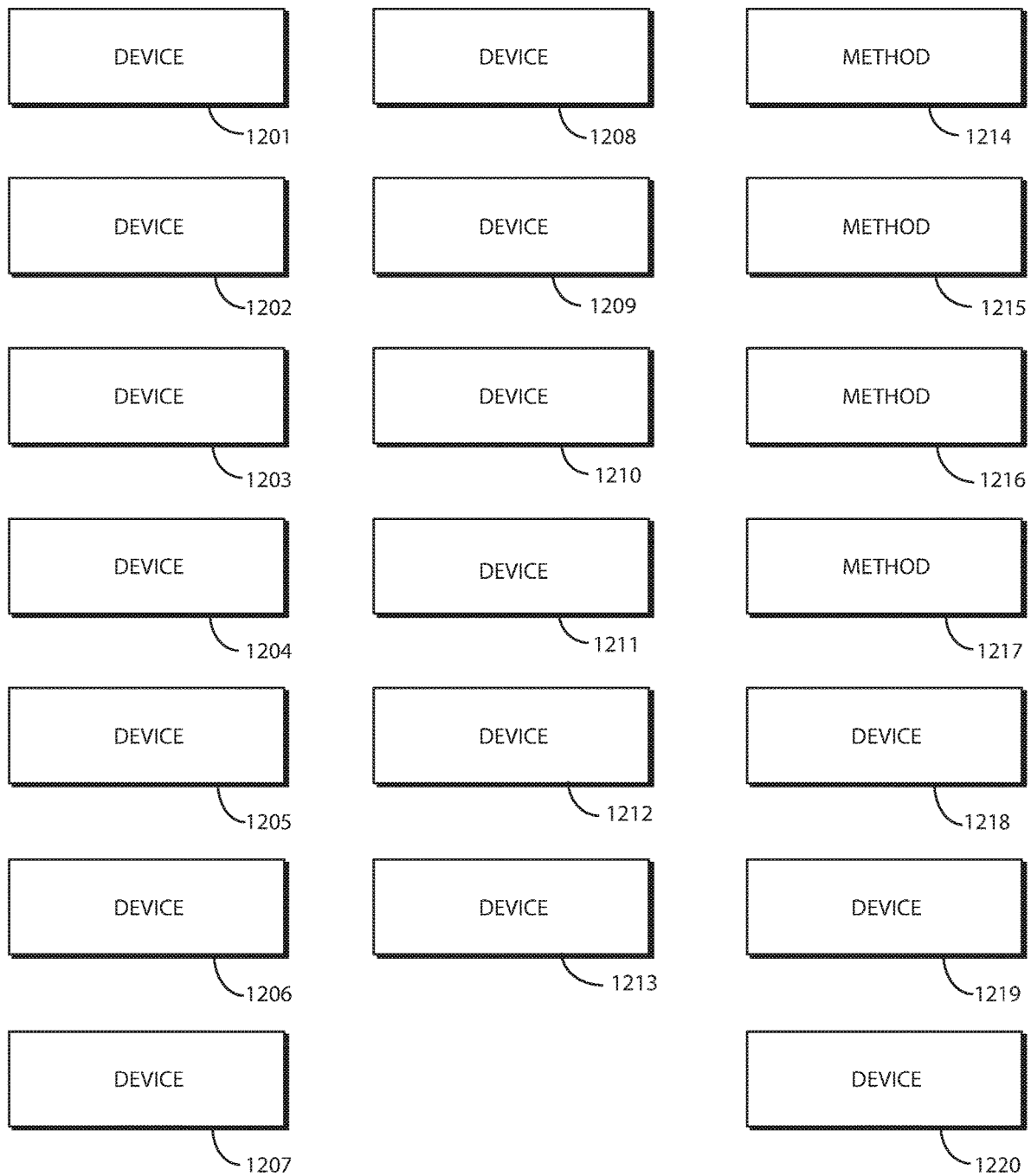
FIG. 12 illustrates one or more embodiments of the disclosure.

Turning now to FIG. 12, illustrated therein are various embodiments of the disclosure. At 1201, an electronic device comprises a communication device communicating with one or more Internet-of-things devices. At 1201, the electronic device comprises one or more processors operable with the communication device. At 1201, the electronic device comprises a memory operable with the one or more processors.

At 1201, the communication device receives, from at least one Internet-of-things device, an event notification. At 1201, the one or more processors identify a notification recipient to whom the event notification should be sent from a plurality of predefined system users. At 1201, the one or more processors select a receiving electronic device from at least two electronic devices belonging to the notification recipient to whom the event notification should be sent. At 1201, the one or more processors convert the event notification from a first event notification type to a second event notification type that is receivable by the receiving electronic device. At 1201, the one or more processors transmit the event notification to the receiving electronic device.

At 1202, the one or more processors of 1201 further, with the at least one Internet-of-things device, determine a location of the notification recipient to whom the event notification should be sent. At 1202, the selection of the receiving electronic device occurs as a function of the location of the notification recipient.

At 1203, the one or more processors of 1202 further, with the at least one Internet-of-things device, identify an activity being performed by the notification recipient to whom the event notification should be sent. At 1203, the selection of the receiving electronic device occurs as a function of the activity being performed by the notification recipient. At 1304, the one or more processors of 1203 delay the transmitting of the event notification as a function of the activity being performed by the notification recipient.

At 1205, the one or more processors of 1204 further determine an urgency associated with the event notification. At 1205, the one or more processors override the delay of the transmitting of the event notification when the event notification is an urgent notification.

At 1206, the one or more processors of 1203 identify the recipient to whom the event notification should be sent by selecting a first person from the plurality of predefined system users when the activity is of a first type and selecting a second person from the plurality of predefined system users when the activity is of a second type.

At 1207, the event notification of 1201 identifies a location of an event from the event notification. At 1207, the identification of the notification recipient to whom the event notification should be sent comprises determining which person from the plurality of predefined system users is closest to the location of the event.

At 1208, the communication device of 1201 further receives, from the at least one Internet-of-things device, an electronic communication identifying a person commencing an activity causing the event notification. At 1208, the notification recipient to whom the event notification should be sent comprises the person commencing the activity causing the event notification.

At 1209, the communication device of 1201 further receives, from the at least one Internet-of-things device, an electronic communication identifying a person commencing an activity causing the event notification. At 1209, identification of the notification recipient to whom the event notification should be sent comprises selecting another person related to the person commencing the activity causing the event notification from a plurality of persons related to the person commencing the activity causing the event notification.

At 1210, the one or more processors of 1201 further, with the at least one Internet-of-things device, identify a field of view of the notification recipient to whom the event notification should be sent. At 1210, the selection of the receiving electronic device occurs as a function of the field of view.

At 1211, the electronic device of 1201 further comprises an artificial intelligence engine operable with the one or more processors and the memory. At 1211, the artificial intelligence engine receives inputs from the one or more Internet-of-things devices and transforms the inputs into machine-learned knowledge stored in the memory. At 1211, the machine-learned knowledge identifies persons from the plurality of persons associated with past events. At 1211, the identification of the notification recipient to whom the event notification should be sent comprises identifying a person from the machine learned knowledge who corresponds to an event identified by the event notification.

At 1212, the one or more processors of 1201 further identify an output capability of the receiving electronic device belonging to the notification recipient to whom the event notification should be sent. At 1212, the conversion of the event notification from the first event notification type to the second event notification type occurs as a function of the output capability of the receiving electronic device belonging to the notification recipient. At 1213, the electronic device of 1201 comprises an Internet-of-things device.

At 1214, a method in an electronic device comprises receiving, with a communication device communicating with one or more Internet-of-things devices, an event notification detected by the one or more Internet-of-things devices. At 1214, the method comprises selecting, with one or more processors operable with the communication device, at least one notification recipient from a plurality of system users as a function of the event notification.

At 1214, the method comprises identifying, with one or more sensors of the one or more Internet-of-things devices, a plurality of electronic devices available to the at least one notification recipient. At 1214, the method comprises determining, from the one or more sensors of the one or more Internet-of-things devices, at least one notification recipient activity being performed by the at least one notification recipient;

At 1214, the method comprises selecting, with the one or more processors, a receiving electronic device to receive the event notification as a function of the at least one notification recipient activity. At 1214, the method comprises converting, with the one or more processors, the event notification from a first event notification type to a second event notification type that is receivable by the receiving electronic device. At 1214, the method comprises transmitting, with the communication device, the event notification to the receiving electronic device.

At 1215, the method of 1214 comprises delaying, with the one or more processors, the transmitting as a function of the at least one notification recipient activity.

At 1216, the method of 1214 further comprises failing to receive, with the communication device, a response from the receiving electronic device after the transmitting of the event notification. At 1216, the method of 1214 further comprises selecting, with the one or more processors, at least one other notification recipient from the plurality of system users.

At 1216, the method of 1214 further comprises identifying, with the one or more sensors, another plurality of electronic devices available to the at least one other notification recipient. At 1216, the method of 1214 further comprises determining, from the one or more sensors, at least one other notification recipient activity being performed by the at least one other notification recipient.

At 1216, the method of 1214 further comprises selecting, with the one or more processors, another receiving electronic device to receive the event notification as a function of the at least one other notification recipient activity. At 1216, the method of 1214 further comprises transmitting, with the communication device, the event notification to the another receiving electronic device.

At 1217, the method of 1216 further comprises determining, with the one or more processors, an urgency of the event notification. At 1217, the method of 1216 further comprises delaying the transmitting of the event notification to the another receiving electronic device where the event notification is other than an urgent event notification.

At 1218, an electronic device comprises a communication device communicating with one or more Internet-of-things devices. At 1218, the electronic device comprises one or more processors operable with the communication device. At 1218, the electronic device comprises a memory operable with the one or more processors.

At 1218, the communication device receives, from at least one Internet-of-things device, an event notification. At 1218, the one or more processors identify a notification recipient to whom the event notification should be sent from a plurality of predefined system users. At 1218, the one or more processors select a receiving electronic device to which the event notification will be delivered from a plurality of electronic devices available to the notification recipient.

At 1218, the one or more processors generate a notification alert as a function of one or more output capabilities of the receiving electronic device. At 1218, the one or more processors transmit, with the communication device, the notification alert to the receiving electronic device.

At 1219, the one or more processors of 1218 further determine, with one or more sensors of the at least one Internet-of-things device, a location of the notification recipient. At 1219, the one or more processors select the receiving electronic device to which the event notification will be delivered occurs as a function of the location.

At 1220, the one or more processors of 1218 further determine, with one or more sensors of the at least one Internet-of-things device, an activity being performed by the notification recipient. At 1220, the one or more processors format the notification alert as a function of the activity being performed by the notification recipient.

As shown and described, embodiments of the disclosure provide an Internet-of-things system with a central console unit that dynamically routes and delivers event notifications to different receiving electronic devices within a network, with the dynamic routing and delivery occurring as a function of event type, notification recipient location, and notification recipient activity. In one or more embodiments, the Internet-of-things devices observe a task and the persons involved in the task, ensuring that the correct individual is notified when the task is completed and an event notification is generated. In one or more embodiments, the Internet-of-things system observes a notification recipient's location and activity and determines the best way to notify the notification recipient.

Embodiments of the disclosure optimize the delivery of event notifications to receiving electronic devices, as well as optimizing the output format of the event notifications. Embodiments of the disclosure also optimize the timing of delivery of event notifications by optionally inserting delays as a function of user activity. Embodiments of the disclosure dynamically route and deliver messages as a function of one or more of notification recipient location, notification recipient orientation, notification recipient activity, event type, and event urgency level.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. An electronic device, comprising:
a communication device communicating with one or more Internet-of-things devices;
one or more processors operable with the communication device;
a memory operable with the one or more processors; and
the communication device receiving, from at least one Internet-of-things device, an event notification;
the one or more processors:
identifying a notification recipient to whom the event notification should be sent from a plurality of predefined system users;
selecting a receiving electronic device from at least two electronic devices belonging to the notification recipient to whom the event notification should be sent;
identifying, with the at least one Internet-of-things device, an activity being performed by the notification recipient to whom the event notification should be sent, wherein the selecting the receiving electronic device occurs as a function of the activity being performed by the notification recipient;
converting the event notification from a first event notification type to a second event notification type that is receivable by the receiving electronic device;
delaying transmitting of the event notification as a function of the activity being performed by the notification recipient by inserting delays, prior to transmitting, with these delays resulting in the event notification being transmitted at a later time; and
transmitting the event notification to the receiving electronic device at the later time.

2. The electronic device of claim 1, the one or more processors further, with the at least one Internet-of-things device, determining a location of the notification recipient to whom the event notification should be sent, wherein the selecting the receiving electronic device occurs as a function of the location of the notification recipient.

3. The electronic device of claim 2, the one or more processors further determining whether the activity being performed by the notification recipient to whom the event notification should be sent precludes the notification recipient to whom the event notification should be sent from responding to the event notification, and where the activity being performed by the notification recipient to whom the event notification should be sent precludes the notification recipient to whom the event notification should be sent from responding to the event notification, selecting another notification recipient to whom the event notification should be sent.

4. The electronic device of claim 1, wherein the transmitting the event notification at the later time occurs when the delays inserted by the one or more processors have expired.

5. The electronic device of claim 1, the one or more processors further determining an urgency associated with the event notification, the one or more processors overriding the delaying of the transmitting of the event notification when the event notification is an urgent notification.

6. The electronic device of claim 3, wherein the identifying the notification recipient to whom the event notification should be sent comprises:
selecting a first person from the plurality of predefined system users when the activity is of a first type; and
selecting a second person from the plurality of predefined system users when the activity is of a second type.

7. The electronic device of claim 1, the event notification identifying a location of an event from the event notification, wherein the identifying the notification recipient to whom the event notification should be sent comprises determining which person from the plurality of predefined system users is closest to the location of the event.

8. The electronic device of claim 1, the communication device further receiving, from the at least one Internet-of-things device, an electronic communication identifying a person commencing an activity causing the event notification, wherein the notification recipient to whom the event notification should be sent comprises the person commencing the activity causing the event notification.

9. The electronic device of claim 1, the communication device further receiving, from the at least one Internet-of-things device, an electronic communication identifying a person commencing an activity causing the event notification, wherein the identifying the notification recipient to whom the event notification should be sent comprises selecting another person related to the person commencing the activity causing the event notification from a plurality of persons related to the person commencing the activity causing the event notification.

10. The electronic device of claim 1, the one or more processors further, with the at least one Internet-of-things device, identifying a field of view of the notification recipient to whom the event notification should be sent, wherein the selecting the receiving electronic device occurs as a function of the field of view.

11. The electronic device of claim 1, further comprising an artificial intelligence engine operable with the one or more processors and the memory, the artificial intelligence engine receiving inputs from the one or more Internet-of-things devices and transforming the inputs into machine learned knowledge stored in the memory identifying persons from a plurality of persons associated with past events, wherein the identifying the notification recipient to whom the event notification should be sent comprises identifying a person from the machine learned knowledge who corresponds to an event identified by the event notification.

12. The electronic device of claim 1, the one or more processors identifying an output capability of the receiving electronic device belonging to the notification recipient to whom the event notification should be sent, wherein the converting the event notification from the first event notification type to the second event notification type occurs as a function of the output capability of the receiving electronic device belonging to the notification recipient.

13. The electronic device of claim 1, wherein the electronic device comprises an Internet-of-things device.

14. A method in an electronic device, the method comprising:
receiving, with a communication device communicating with one or more Internet-of-things devices, an event notification detected by the one or more Internet-of-things devices;
selecting, with one or more processors operable with the communication device, at least one notification recipient from a plurality of system users by determining, when multiple system users are within a vicinity of an event giving rise to the event notification, which system user is closest to the event giving rise to the event notification;
identifying, with one or more sensors of the one or more Internet-of-things devices, a plurality of electronic devices available to the at least one notification recipient;
determining, from the one or more sensors of the one or more Internet-of-things devices, at least one notification recipient activity being performed by the at least one notification recipient;
selecting, with the one or more processors, a receiving electronic device to receive the event notification as a function of the at least one notification recipient activity;
converting, with the one or more processors, the event notification from a first event notification type to a second event notification type that is receivable by the receiving electronic device; and
transmitting, with the communication device, the event notification to the receiving electronic device.

15. The method of claim 14, further comprising delaying, with the one or more processors, the transmitting as a function of the at least one notification recipient activity.

16. The method of claim 14, further comprising:
failing to receive, with the communication device, a response from the receiving electronic device after the transmitting of the event notification;
selecting, with the one or more processors, at least one other notification recipient from the plurality of system users;
identifying, with the one or more sensors, another plurality of electronic devices available to the at least one other notification recipient;
determining, from the one or more sensors, at least one other notification recipient activity being performed by the at least one other notification recipient;
selecting, with the one or more processors, another receiving electronic device to receive the event notification as a function of the at least one other notification recipient activity; and
transmitting, with the communication device, the event notification to the another receiving electronic device.

17. The method of claim 16, further comprising determining, with the one or more processors, an urgency of the event notification, and delaying the transmitting of the event notification to the another receiving electronic device where the event notification is other than an urgent event notification.

18. An electronic device, comprising:
a communication device communicating with one or more Internet-of-things devices;
one or more processors operable with the communication device;
a memory operable with the one or more processors; and
the communication device receiving, from at least one Internet-of-things device, an event notification;
the one or more processors:
identifying a notification recipient to whom the event notification should be sent from a plurality of predefined system users;
selecting a receiving electronic device to which the event notification will be delivered from a plurality of electronic devices available to the notification recipient;
generating a notification alert as a function of one or more output capabilities of the receiving electronic device;
delaying transmission of the notification alert by an amount of time; and
transmitting, with the communication device, the notification alert to the receiving electronic device after the amount of time has passed.

19. The electronic device of claim 18, further comprising the one or more processors determining, with one or more sensors of the at least one Internet-of-things device, a location of the notification recipient, wherein the selecting the receiving electronic device to which the event notification will be delivered occurs as a function of the location.

20. The electronic device of claim 18, further comprising the one or more processors determining, with one or more sensors of the at least one Internet-of-things device, an activity being performed by the notification recipient, and formatting, with the one or more processors, the notification alert as a function of the activity being performed by the notification recipient.

* * * * *